United States Patent
Epaud et al.

(10) Patent No.: US 11,400,836 B2
(45) Date of Patent: Aug. 2, 2022

(54) VEHICLE SEAT WITH INCLINABLE SEAT BACK

(71) Applicant: FAURECIA Sièges d'Automobile, Nanterre (FR)

(72) Inventors: David Epaud, Lardy (FR); Farouk Bouzid, Bretigny sur Orge (FR); Sylvain Roche, Varennes Changy (FR)

(73) Assignee: FAURECIA Sièges d'Automobile, Nanterre (FR)

( * ) Notice: Subject to any disclaimer, the term of this patent is extended or adjusted under 35 U.S.C. 154(b) by 24 days.

(21) Appl. No.: 16/910,313

(22) Filed: Jun. 24, 2020

(65) Prior Publication Data

US 2020/0406791 A1 Dec. 31, 2020

(30) Foreign Application Priority Data

Jun. 25, 2019 (FR) ..................................... 19 06894

(51) Int. Cl.
*B60N 2/20* (2006.01)
*B60N 2/30* (2006.01)
(Continued)

(52) U.S. Cl.
CPC ........... *B60N 2/231* (2013.01); *B60N 2/0232* (2013.01); *B60N 2/2251* (2013.01); *B60N 2/943* (2018.02);
(Continued)

(58) Field of Classification Search
CPC ........ B60N 2/20; B60N 2/224; B60N 2/2251; B60N 2/231; B60N 2/232; B60N 2/943;
(Continued)

(56) References Cited

U.S. PATENT DOCUMENTS

| 4,103,964 A * | 8/1978 | Klingelhofer ............ B60N 2/20 |
| | | 297/378.12 X |
| 4,312,537 A * | 1/1982 | Lindenberg .............. B60N 2/12 |
| | | 297/378.12 X |

(Continued)

FOREIGN PATENT DOCUMENTS

| DE | 102009007051 B3 | 5/2010 |
| DE | 102009022568 A1 * | 11/2010 ........... B60N 2/3031 |

(Continued)

OTHER PUBLICATIONS

French Preliminary Search Report for French App. No. 1906894 dated May 28, 2020, BET200146 FR, 9 pages, (No English Translation).

*Primary Examiner* — Rodney B White
(74) *Attorney, Agent, or Firm* — Barnes & Thornburg LLP

(57) ABSTRACT

A vehicle seat comprising a seatback mounted pivoting by an articulation mechanism selectively lockable and unlockable, relative to a seatback footing selectively lockable and unlockable on a base, where the seat further comprises a seat cushion, first and second rear connecting rods connecting the seatback to the base, an actuating device being configured, by rotation of the first rear connecting rod, for driving the seatback into a folded down position when the articulation mechanism is unlocked and the seatback footing is locked on the base, and for driving the seat in a forward tilted position when the seatback footing is unlocked and the articulation mechanism is locked.

10 Claims, 22 Drawing Sheets

(51) Int. Cl.
*B60N 2/23* (2006.01)
*B60N 2/90* (2018.01)
*B60N 2/02* (2006.01)
*B60N 2/225* (2006.01)
*B60N 2/22* (2006.01)

(52) U.S. Cl.
CPC ...... *B60N 2/224* (2013.01); *B60N 2002/0236* (2013.01); *B60N 2002/924* (2018.02)

(58) Field of Classification Search
CPC .... B60N 2/3045; B60N 2/3047; B60N 2/305; B60N 2002/924; B60N 2002/0236
USPC ........................ 297/334, 336, 378.12, 378.14
See application file for complete search history.

(56) References Cited

U.S. PATENT DOCUMENTS

| | | | | |
|---|---|---|---|---|
| 5,240,309 | A * | 8/1993 | Kojer | B60N 2/20 297/378.12 X |
| 5,588,707 | A * | 12/1996 | Bolsworth | B60N 2/3013 297/334 X |
| 6,152,533 | A * | 11/2000 | Smuk | B60N 2/12 297/378.12 X |
| 6,474,739 | B1 * | 11/2002 | Lagerweij | B60N 2/0705 297/378.12 X |
| 6,655,738 | B2 * | 12/2003 | Kammerer | B60N 2/0292 297/378.12 X |
| 6,983,993 | B2 * | 1/2006 | Hahn | B60N 2/206 297/378.12 X |
| 7,300,107 | B2 * | 11/2007 | Kammerer | B60N 2/0292 297/334 X |
| 7,374,244 | B2 | 5/2008 | Becker | |
| 7,497,517 | B2 * | 3/2009 | Gundall | B60N 2/206 297/334 X |
| 7,517,022 | B2 * | 4/2009 | Habedank | B60N 2/06 297/378.12 X |
| 7,967,385 | B2 | 6/2011 | Cillierre | |
| 8,096,616 | B2 * | 1/2012 | Ventura | B60N 2/206 297/334 |
| 8,182,037 | B2 * | 5/2012 | Jeong | B60N 2/859 297/378.12 X |
| 8,424,969 | B2 * | 4/2013 | Kammerer | B60N 2/0292 297/378.12 X |
| 8,474,910 | B2 * | 7/2013 | Kammerer | B60N 2/3031 297/334 |
| 8,602,495 | B2 * | 12/2013 | Jeong | B60N 2/3065 297/334 |
| 9,649,956 | B2 * | 5/2017 | Lehmann | B60N 2/065 |
| 9,987,955 | B2 * | 6/2018 | Ecker | B60N 2/0232 |
| 10,308,146 | B1 * | 6/2019 | Kish | B60N 2/12 |
| 10,518,663 | B1 * | 12/2019 | Kakishima | B60N 2/0155 |
| 10,926,673 | B2 * | 2/2021 | Kaemmerer | B60N 2/3011 |
| 11,040,641 | B2 * | 6/2021 | Epaud | B60N 2/32 |
| 2006/0152058 | A1 * | 7/2006 | Pejathaya | B60N 2/3065 297/378.12 |
| 2011/0037304 | A1 * | 2/2011 | Kammerer | B60N 2/309 297/340 |
| 2015/0061339 | A1 * | 3/2015 | Perrin | B60N 2/3065 297/378.1 |
| 2015/0091358 | A1 * | 4/2015 | Hattori | B60N 2/682 297/452.2 |
| 2017/0080831 | A1 | 3/2017 | Kaemmerer | |
| 2017/0217336 | A1 * | 8/2017 | Wolf | B60N 2/20 |
| 2019/0023156 | A1 * | 1/2019 | Ninagawa | B60N 2/20 |
| 2019/0092191 | A1 | 3/2019 | Bouzid | |
| 2019/0225120 | A1 * | 7/2019 | Kish | B60N 2/045 |
| 2019/0366886 | A1 * | 12/2019 | Sivaraj | B60N 2/3065 |
| 2019/0389335 | A1 * | 12/2019 | Epaud | B60N 2/3065 |
| 2020/0001742 | A1 | 1/2020 | Epaud | |
| 2020/0101869 | A1 * | 4/2020 | Bouzid | B60N 2/0232 |
| 2020/0101870 | A1 * | 4/2020 | Aktas | B60N 2/0806 |
| 2020/0101872 | A1 * | 4/2020 | Epaud | B60N 2/3065 |
| 2020/0180474 | A1 * | 6/2020 | Moon | B60N 2/206 |
| 2020/0189421 | A1 * | 6/2020 | Madhu | B60N 2/20 |
| 2021/0206297 | A1 * | 7/2021 | Aktas | B60N 2/06 |

FOREIGN PATENT DOCUMENTS

| | | | | |
|---|---|---|---|---|
| DE | 102011120528 A1 * | 6/2013 | ........... | B60N 2/3013 |
| DE | 102013007445 A1 * | 11/2013 | ............ | B60N 2/305 |
| DE | 102014213860 A1 | 11/2015 | | |
| DE | 102019125835 A1 * | 4/2020 | ........... | B60N 2/0232 |
| FR | 2888790 A1 | 1/2007 | | |
| FR | 2928881 B1 | 9/2009 | | |
| FR | 3083174 A1 | 1/2020 | | |

\* cited by examiner

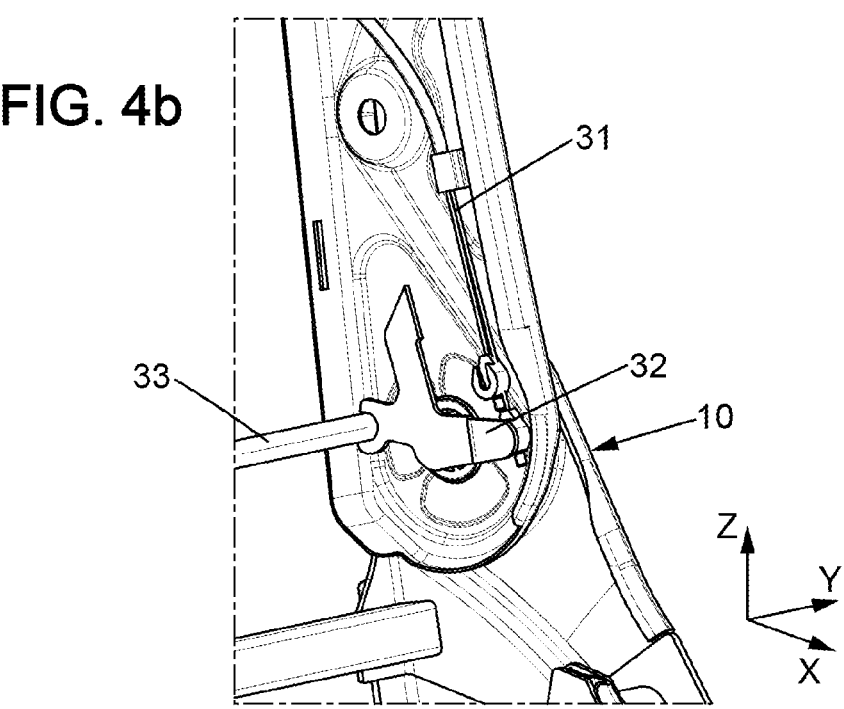

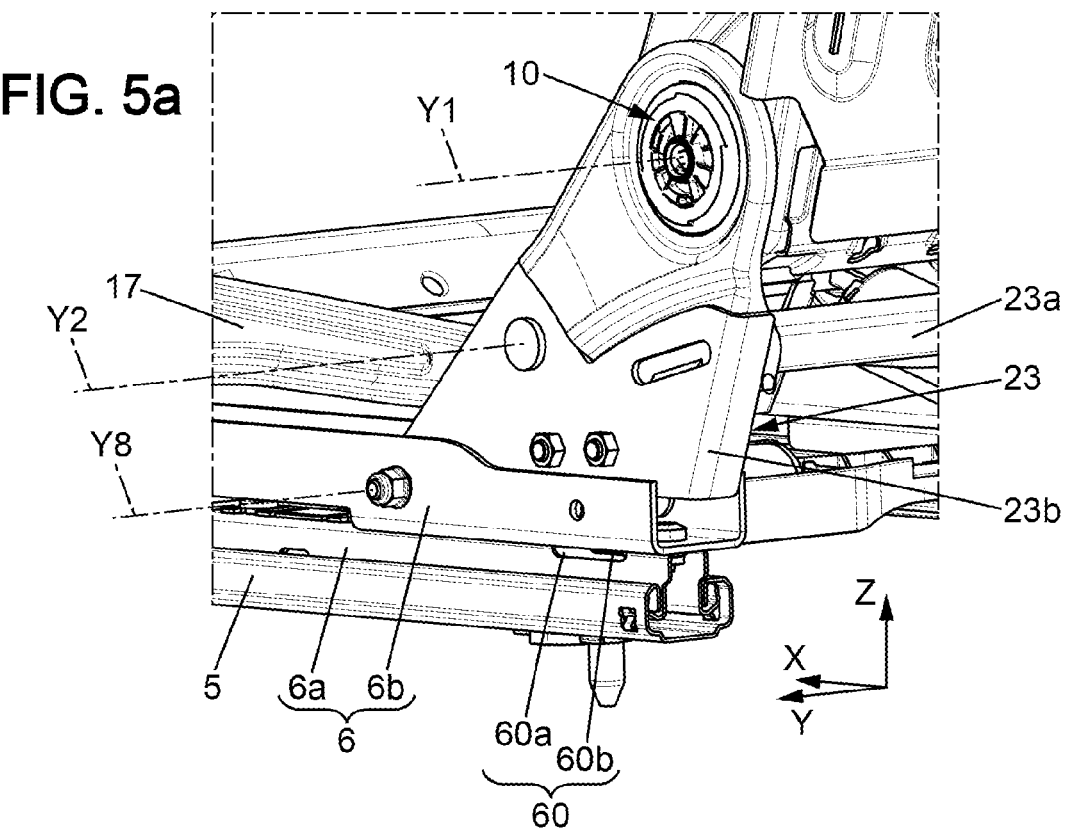

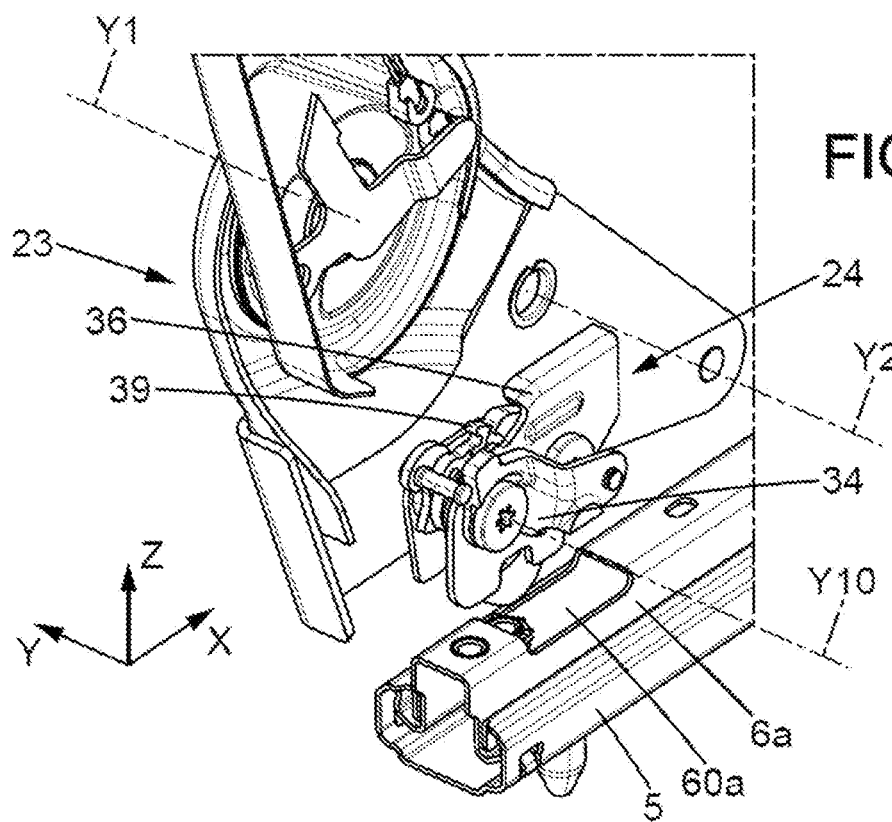

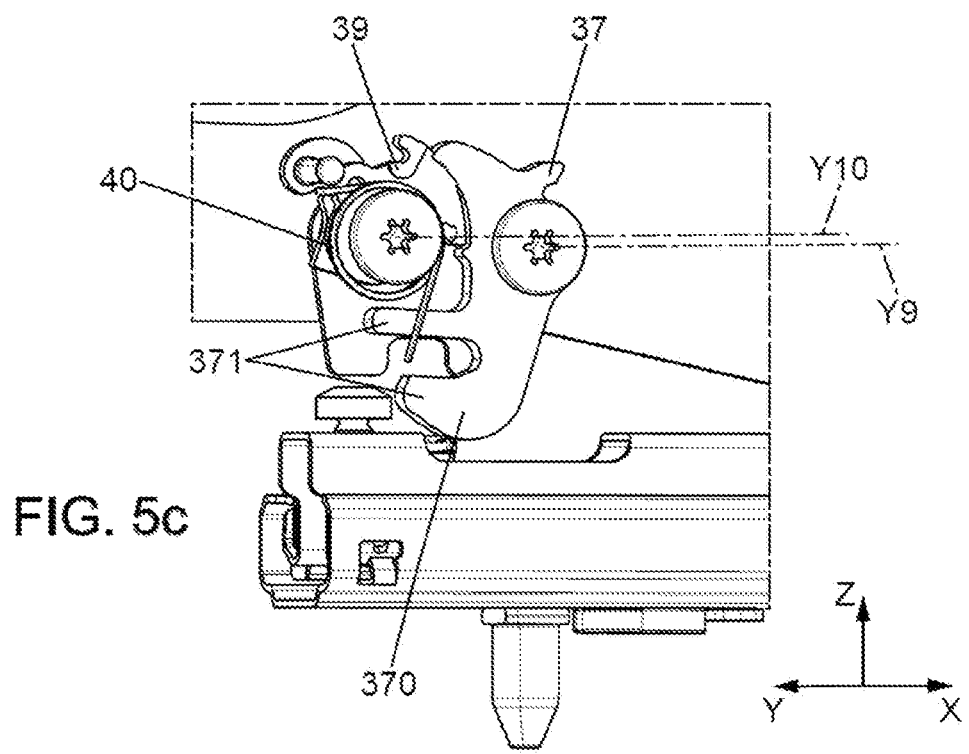

VEHICLE SEAT WITH INCLINABLE SEAT BACK

PRIORITY CLAIM

This application claims priority to French Patent Application No. 19 06894, filed Jun. 25, 2019, which is expressly incorporated by reference herein.

BACKGROUND

The present disclosure relates to seats, and particularly, vehicle seats.

SUMMARY

According to the present disclosure, a vehicle seat comprises:
a seatback;
a seat cushion comprising at least one longitudinal connecting rod;
a base;
a seatback footing mounted on the base.

In illustrative embodiments, a locking device is selectively lockable for locking the seatback footing on the base and unlockable for releasing the seatback footing, and the released seatback footing is rotationally mobile relative to the base.

In illustrative embodiments, the seatback is mounted pivoting on the seatback footing around a first pivot by an articulation mechanism suited for adjusting an angular position of the seatback.

In illustrative embodiments, the articulation mechanism is mobile between a locked position where the seatback is immobilized relative to the seatback footing, and an unlocked position where the seatback can pivot relative to the seatback footing around the first pivot.

In illustrative embodiments, the seat cushion is mounted pivoting on the seatback footing around a second pivot parallel to the first pivot, and where said seat cushion is born by at least one front connecting rod connected pivotably to the seat cushion by a third pivot and to the base by a fourth pivot, where the front connecting rod is mobile between a raised position for normal use of the seat and a position tilted forward.

In illustrative embodiments, the seatback is connected to the base by means of a first rear connecting rod mounted pivoting on a second rear connecting rod by a fifth pivot, where the first rear connecting rod is mounted pivoting on the base by a sixth pivot, where the second rear connecting rod is mounted pivoting on the seatback by a seventh pivot, and where the fifth, sixth and seventh pivots are parallel to the first pivot; the seat further comprising an actuating device configured for actuating the first rear connecting rod in rotation around the sixth pivot.

In illustrative embodiments, the seat cushion is mounted pivoting on the seatback footing through the longitudinal connecting rod which is pivotably connected to the seatback footing around the second pivot, and said seat cushion is born by the at least one front connecting rod through the longitudinal connecting rod, where the at least one front connecting rod is connected pivotably to the longitudinal connecting rod by the third pivot.

In illustrative embodiments, because of these arrangements, it is possible by simply commanding the first rear connecting rod:

either to adjust the inclination of the seatback for the comfort of the user and possibly for folding down the seatback forward, by actuating the first rear connecting rod while the locking device of the seatback footing remains locked and while the articulation mechanism of the seatback is unlocked;

or else to tilt the entire seat forward, by actuating the first rear connecting rod while the locking device of the seatback footer is unlocked and the articulation mechanism of the seatback remains locked.

In illustrative embodiments, the actuating device is further configured for actuating the first connecting rod in rotation:

in a first direction, from a rest position to a first connecting rod position, when the articulation mechanism is unlocked and the locking mechanism is locked, by driving the seatback toward a substantially horizontal retracted position by means of the second connecting rod and in a second direction, from the rest position toward a second connecting rod position, when the articulation mechanism is locked and the locking device is unlocked, by driving the seat cushion and the seatback into a first position tilted forward.

In illustrative embodiments, the actuation device is further configured for actuating the first rear connecting rod in rotation from a rest position to an intermediate connecting rod position when the articulation mechanism is unlocked and the locking device is locked, where the seatback is rotated relative to the seatback footing around the first pivot between a normal position of use and a comfortable position.

In illustrative embodiments, actuation of the first rear connecting rod in rotation between the rest position and the intermediate position of the connecting rod serves to adjust the tilt of the seatback for the comfort of the user. In an embodiment, the intermediate connecting rod position is located between the rest position and the second connecting rod position, the first rear connecting rod being actuated in the second direction for driving the seatback toward the comfortable position.

In illustrative embodiments, the seventh pivot is located forward of the first pivot.

In illustrative embodiments, the actuation device comprises a pinion commanded by an electric motor, where the first rear connecting rod is provided with a toothed sector meshing with the pinion.

In illustrative embodiments, the actuation device comprises a hydraulic cylinder provided with a cylinder body and a piston arranged in the cylinder body, where the piston is configured for actuating the first rear connecting rod in rotation around the sixth pivot by translation in the cylinder body, and where the cylinder body is fixed to the base.

In illustrative embodiments, the seat has two sides and comprises, respectively on the two sides:
two front connecting rods;
two seatback footings;
two first rear connecting rods connected respectively to one side of the seatback;
two second rear connecting rods connected respectively to one side of the base;
where the actuating device is configured for actuating the two first rear connecting rods.

In illustrative embodiments, the seat comprises an electric command device configured for controlling the articulation mechanism, the locking device and the actuation device, the electric command device being configured for normally being in a locking mode where the locking device locks the seatback footing onto the base, the articulation mechanism is in a locked position and the actuation device is not actuated, and said electric command device being actuatable for:

either putting the articulation mechanism in unlocked position and then operating the actuating device while leaving the seatback footing locked onto the base;

or else unlocking the locking device for releasing the seatback footing and then operating the actuating device while leaving the articulation mechanism in locked position.

In illustrative embodiments, the articulation mechanism and the locking device are commanded by a single locking command system belonging to one among the seatback, seat cushion and base, where said electric command device controls the locking command system and the actuating device.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 4b is a detailed view of the locking devices shown in FIG. 4a;

FIG. 5a is a detailed view of a locking device for a seatback footing on a base;

FIG. 5b is a detailed view from FIG. 5a with elements hidden;

FIG. 5c is a view of the part of the seat from FIG. 5b shown from another angle with elements hidden;

DETAILED DESCRIPTION

In the various figures, the same references designate identical or similar items.

In the description which follows, the indications for spatial positioning such as top, bottom, upper, lower, horizontal, vertical, etc. are given for clarity of the exposition, according to the usual position of use of the track and the seat, but are not limiting. More specifically, the orientations relative to the front and rear of the seat are relative to the usual position of use of the track and the seat.

Figure 1:
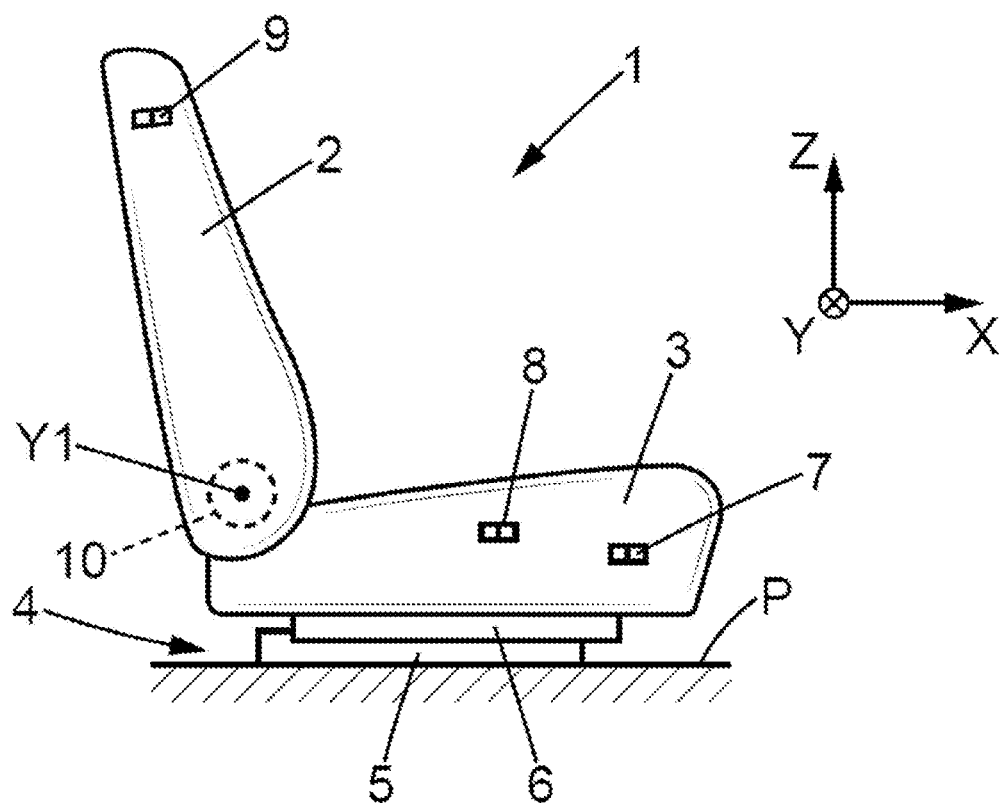
FIG. 1 is a schematic view of an automotive vehicle seat.

FIG. 1 shows an automotive vehicle seat 1 which comprises the seatback 2 mounted on a seat cushion 3. The seat in question can for example be a front seat, but could also be a rear seat in a second or third row.

The seat cushion 3 is fixed on the floor P of the vehicle by means of tracks 4 which allow the seat 1 slide on the floor P in a horizontal, longitudinal direction X, toward the front and toward the rear. The direction X may or may not be coincident with the direction of forward movement of the vehicle.

There may be two tracks 4 and they may each comprise a fixed profile 5 secured to the floor P and a mobile profile 6a which slides on the fixed profile 5 and which carries the seatback 2 and seat cushion 3 of the seat. The mobile profile may be locked in position on the fixed profile by a mechanical lock and/or by a track actuating electrical device (well known as such). In the specific case considered here, the tracks 4 can be electrically commanded and can be actuated by a user of the seat by using an actuation member 7 such as a bidirectional command button, but this arrangement is not mandatory in the context of the present description.

The mobile profiles 6a of the two tracks 4 together form a base 6 bearing the seatback 2 and the seat cushion 3. In a variant, the seat might not have tracks 4 and the base 6 could be formed by a part of the floor P of the vehicle.

Figure 2:
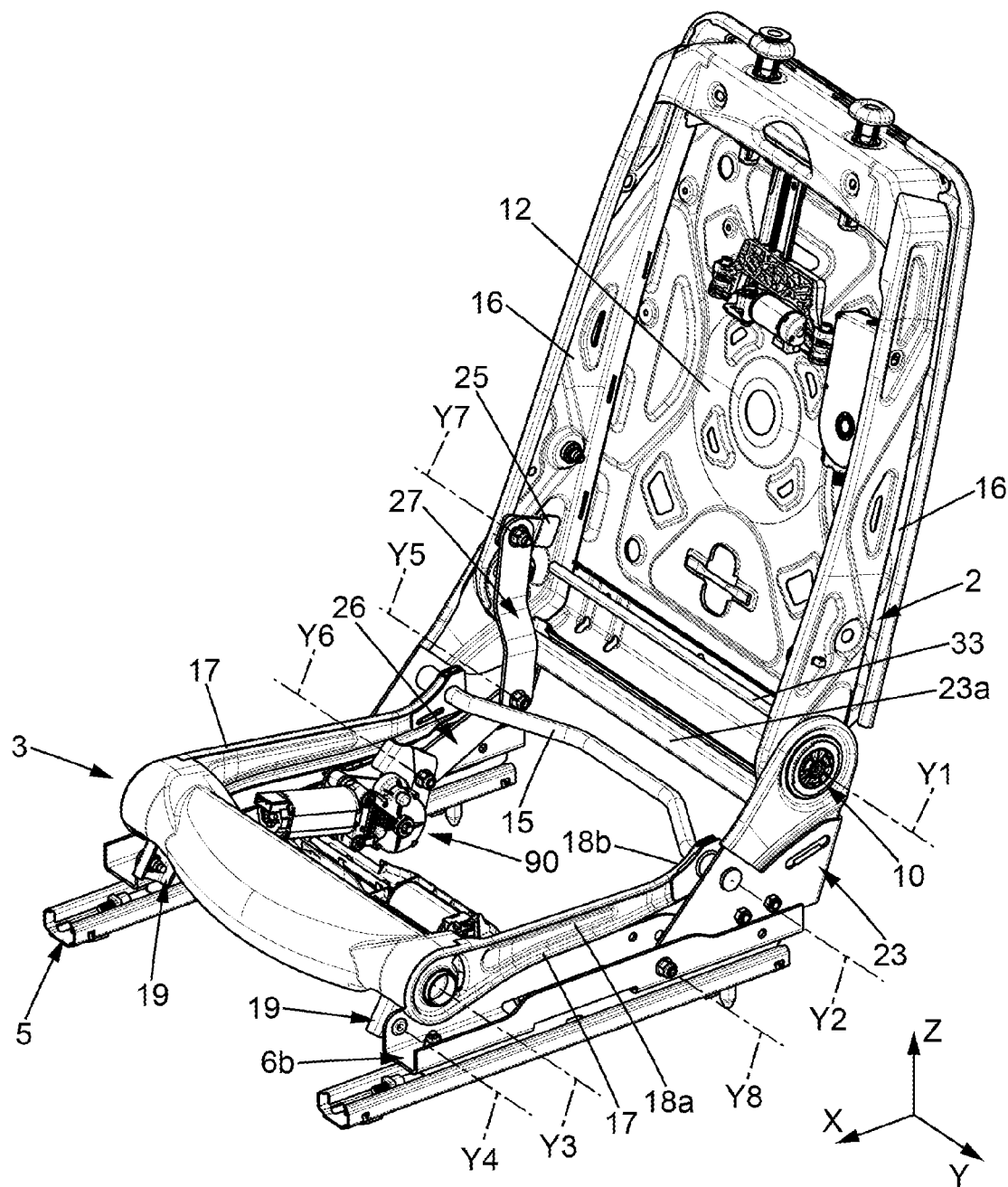
FIG. 2 is a perspective view of the seat from FIG. 1, according to an embodiment from the present description, in normal position of use.

FIG. 2 shows an embodiment of the automotive vehicle seat, in the normal position of use. The seatback 2 of the seat is provided with a articulation mechanism 10 with which the seatback 2 can be pivoted forward and backward, in particular around a transverse axis Y1 which is horizontal and perpendicular to the longitudinal direction X.

Figure 3:
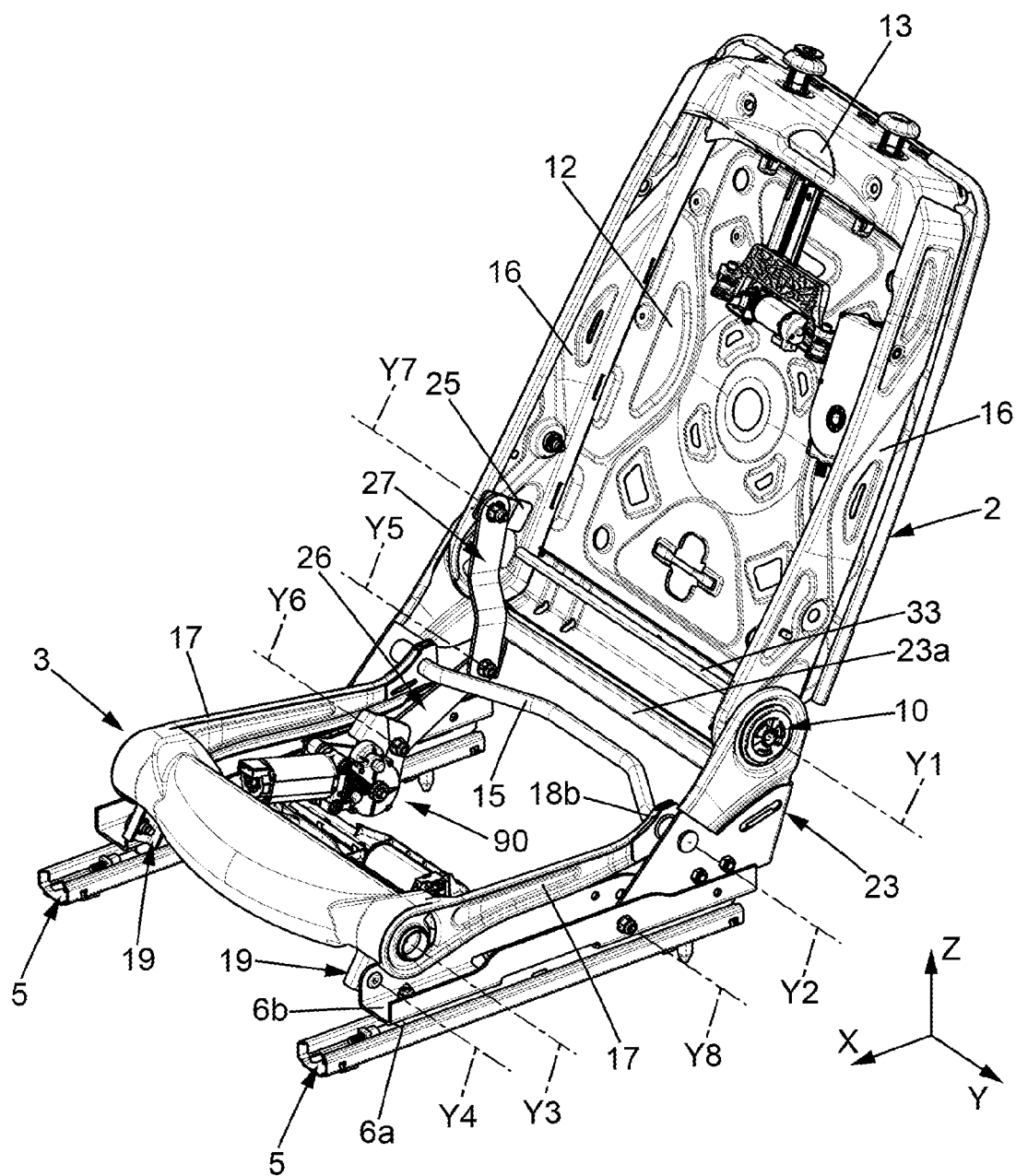
FIG. 3 is a perspective view of the seat from FIG. 2 in a comfortable position.

FIG. 3 shows the seat according to the same embodiment but in comfortable position, with the seatback 2 more inclined backward compared to the normal position of use. The seat is said to be in comfortable position when the seatback is in comfortable position.

The movement of the seatback 2 can be commanded electrically by the user, for example by two actuating members 8, 9 such as bidirectional command buttons, as will be explained later. These are not however mandatory, since the movements of the seatback 2 could be done manually without electric adjustment device.

Figure 4A:
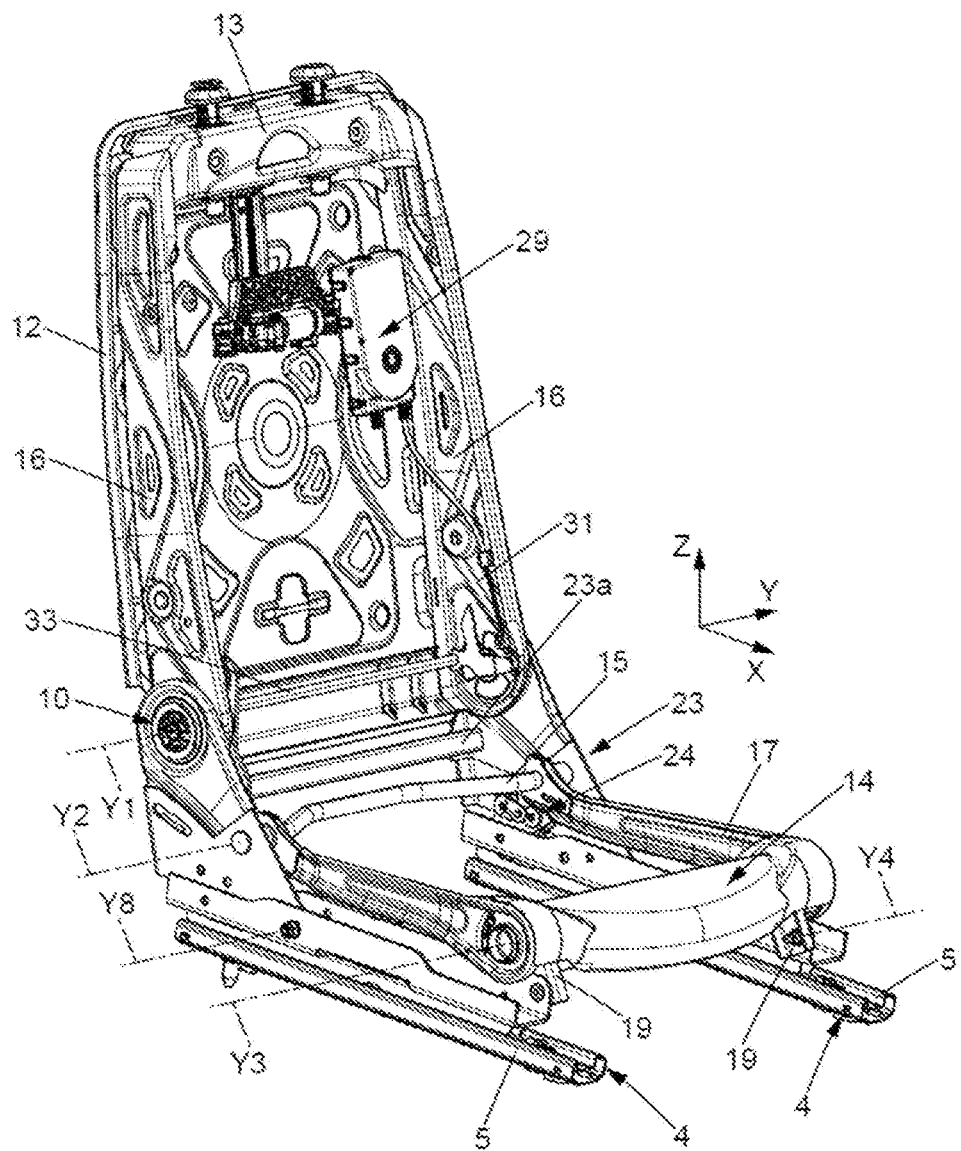
FIG. 4a is a perspective view showing locking devices with which the seat from FIG. 2 can be equipped.

As shown in FIGS. 2 to 4, the frame of the seatback 2 can be made of metal or another strong material and could in particular comprise: two lateral side plates 16, a back 12, and an upper crosspiece 13 connecting the upper ends of the lateral side plates 16.

The framework of the seat cushion 3 can be made of metal or another strong material and could in particular comprise a front crosspiece 14 and a rear crosspiece 15 between which a suspension sheet is stretched which carries the padding (not shown) of the seat cushion.

The framework of the seat cushion 3 may further comprise two parallel, curved longitudinal connecting rods 17, arranged respectively from the two sides the seat. Each curved longitudinal connecting rod 17 has a general substantially L-shape comprising a first section 18*a* substantially horizontal toward the front and a second section 18*b* extending upward and rearward from the first section 18*a*, to a rear end which is mounted freely pivoting on the rear crosspiece 15 around a transverse axis Y2 parallel to the axis Y1. The axis Y2 is arranged below the axis Y1 in normal position of use. According to an embodiment shown, the second section 18*b* extends along a length less than 10% of a length of the first section 18*a*.

The two curved longitudinal connecting rods 17 are connected together by the front 14 and rear 15 cross pieces, and define a support part on which a user can sit.

Figure 10:
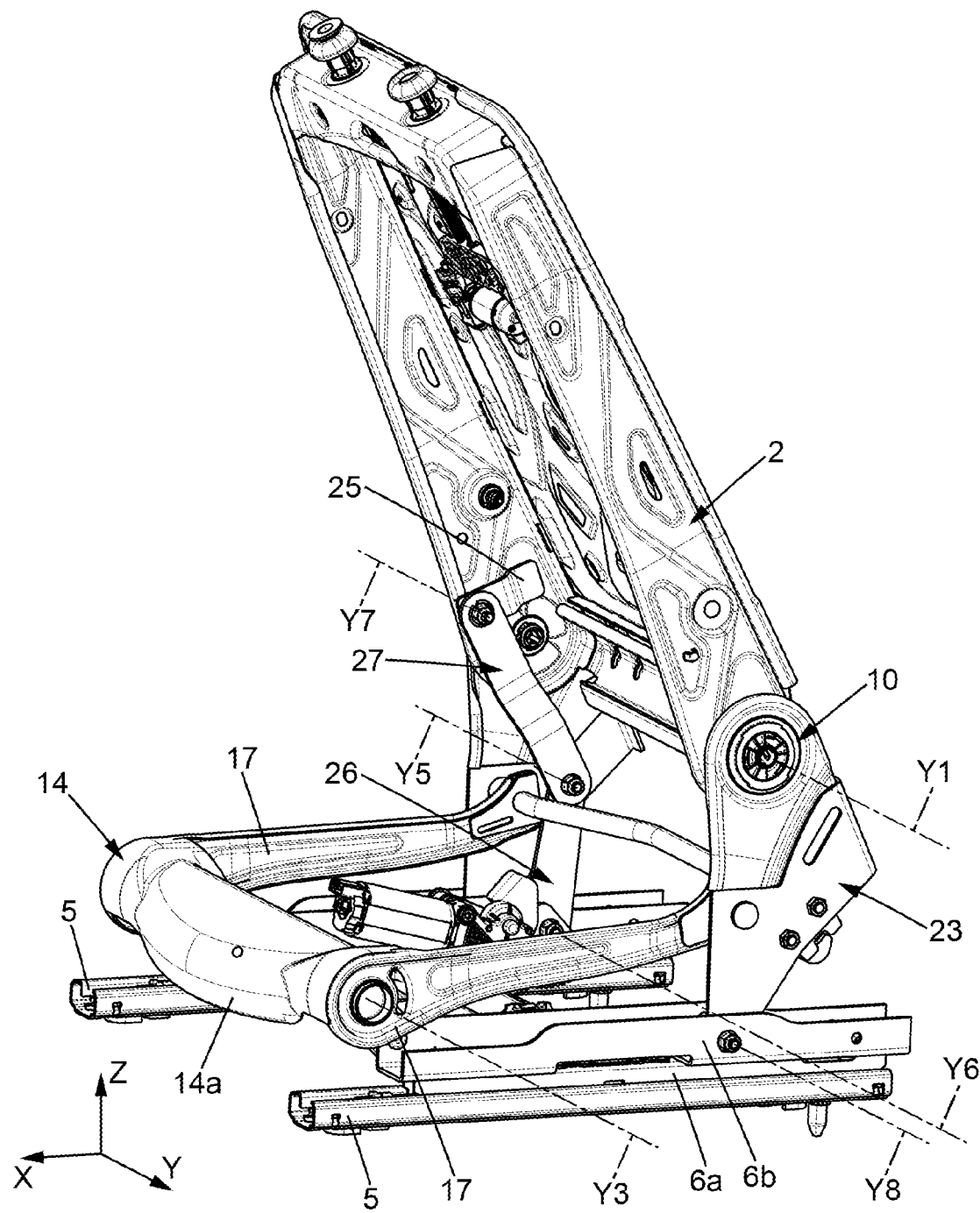
FIG. 10 is a perspective view of the seat from FIG. 2 in tilted forward position.
Figure 11:
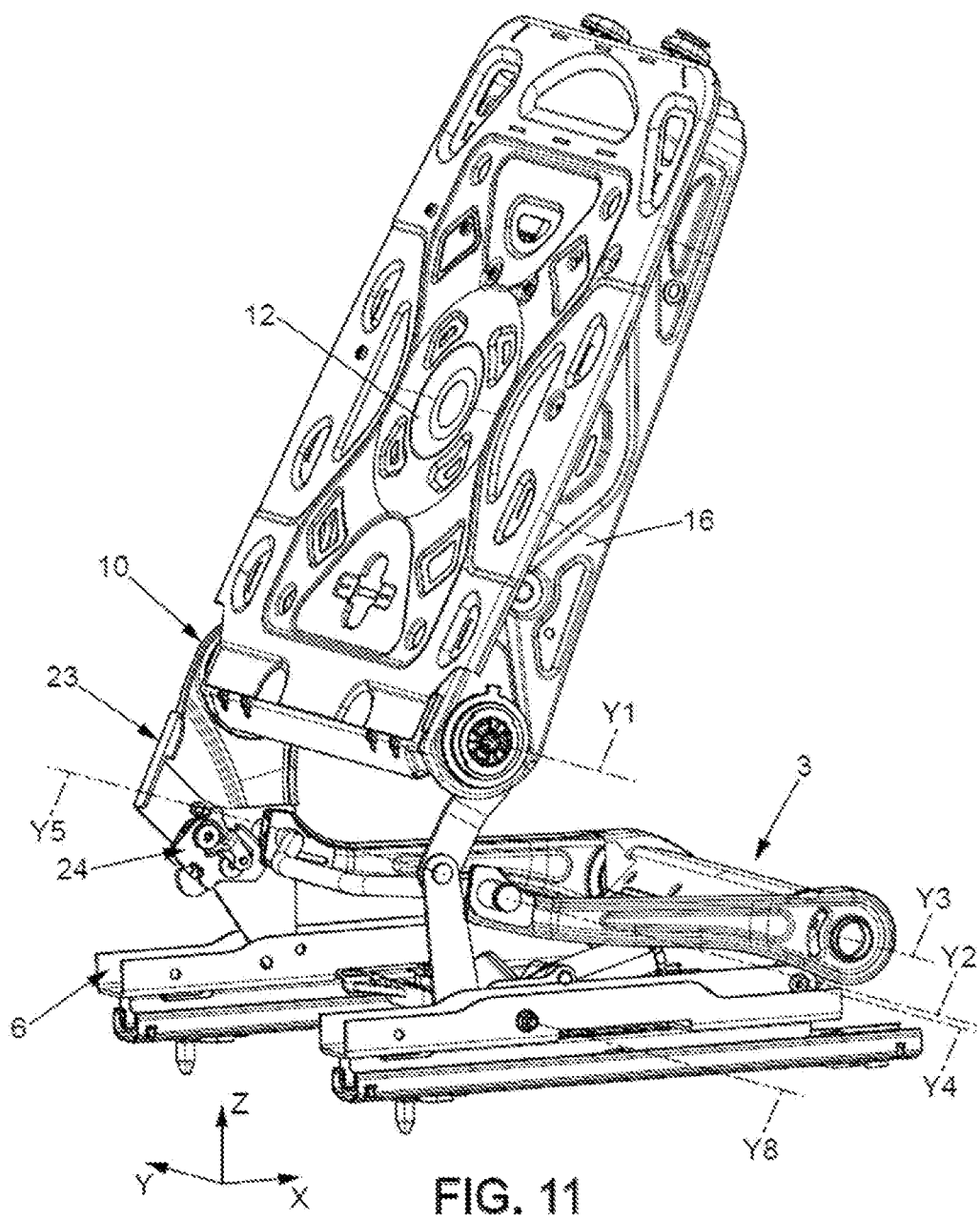
FIG. 11 is a lateral view of the seat from FIG. 10 with elements hidden.

The front ends of the first sections 18*a* of the two longitudinal curved connecting rods 17 are mounted pivoting on the upper ends of the two parallel front connecting rods 19, around a transverse axis of rotation Y3 parallel to the axis Y1. The lower ends of the front connecting rods 19 are mounted pivoting on the multiple profiles 6*a* of the tracks, in particular on the rigid supports 6*b* fixed to said mobile profiles 6*a*, around a transverse axis of rotation Y4, parallel to the axis Y1. Each front connecting rod 19 is mobile between a raised position corresponding to a normal position of use or comfortable position of the seat (FIGS. 2-3) and a tilted forward position (FIG. 10).

Figure 12:
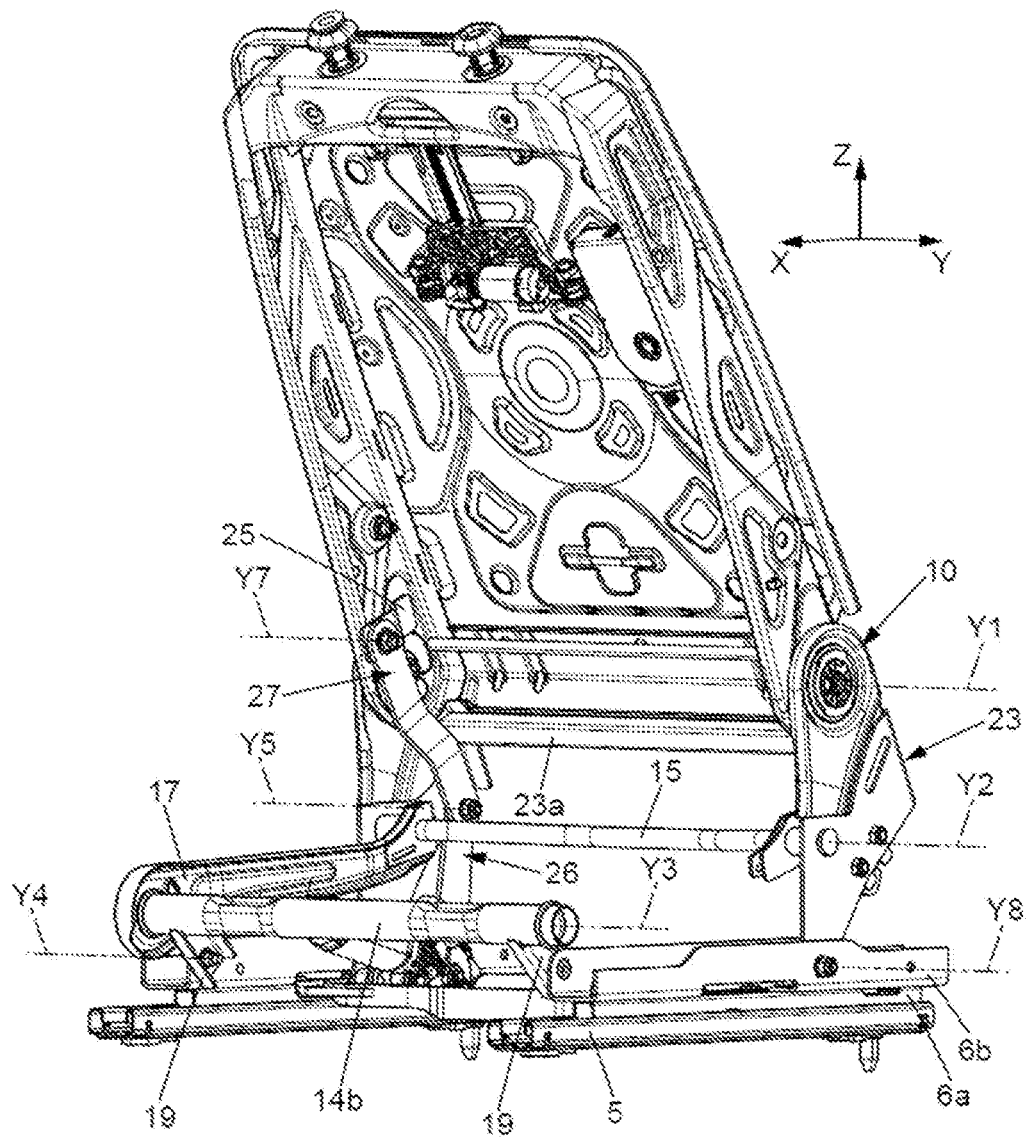
FIG. 12 is another perspective view of the seat from FIG. 10 with elements hidden.

The front crosspiece 14 may comprise a side piece 14*a* and an inner crosspiece 14*b*, which is shown in FIG. 12 and which extends longitudinally along the axis Y3. As shown in FIG. 12, the lower end of one of the front connecting rods 19 (or as applicable of the two front connecting rods 19) may be provided with an opening mounted centered on the axis Y4, where the front connecting rod 19 is pivoting around the axis Y4 because of a ball bearing for example or any other assembly element allowing formation of a pivoting connection. The upper end of one of the front connecting rods 19 (or as applicable of the two front connecting rods 19) may be provided with a hollow housing suited for receiving the body of the inner crosspiece 14*b*, as is shown in FIG. 12.

In the case where the seat is electrically commanded, the lower end of one of the front connecting rods 19 (or as applicable both front connecting rods 19) may be provided with a toothed sector centered on the axis Y4, which meshes with a pinion commanded by an electric motor with a reduction gear fixed to the support 6*b*, for example. In this variant, one of the front connecting rods (or as applicable both front connecting rods 19) is electrically commanded between the raised position and the tilted forward position. In the implementation of the seat disclosed in the present description, such a command of the connecting rods 19 is not necessary.

The seat 1 further comprises, on both sides of the seat, respectively two stiff seatback footings 23, for example metal, which may for example each extend in an XZ plane where Z is a vertical axis. The two seatback footings may possibly be connected to each other by at least one stiff crosspiece 23*a* (FIGS. 2 to 6).

The seatback 2 is mounted pivoting on the seatback footings 23 by said articulation mechanism 10, as applicable by two articulation mechanisms 10 disposed on both sides of the seat and commanded in synchronization, as in the example shown. The or each articulation mechanism 10 may for example be a cam and grain articulation mechanism mobile between a locked position where said articulation mechanism 10 immobilizes the seatback 2 relative to the seatback footings 23 and an unlocked position where the seatback 2 can pivot relative to the seatback footings 23 around the axis Y1. The user can thus adjust the inclination of the seatback 2 forward and backward for their comfort, including by putting the seatback 2 in a relaxation position mostly inclined backward.

Each seatback footing 23 is mounted on the corresponding support 6*b* and is mobile in rotation around an axis Y8 by a pivot connection. In the embodiment shown, a locking device 24 is provided selectively lockable for locking the seatback footing 23 on the base 6 and unlockable for releasing the seatback footing 23. When the locking device 24 is locked, any rotational movement of the footing around the axis Y8 is blocked. When the locking device 24 is unlocked, the seatback footing 23 can be rotated forward around the axis Y8.

Possibly, a single locking device 24 could be provided for a single side of the seat. In the case at hand, nonetheless nonlimiting, if the only locking device 24 locks the corresponding footing 23 against the corresponding support 6*b*, any movement of the footing located on the other side of the seat is also blocked. In this way, a single locking device 24 could be provided.

The seatback 2 may further comprise a locking system 29 commanding the locking device 24 of the seatback footing 23 and the one or more articulation mechanisms 10. This locking system 29 may for example be fixed to the back 12 of the seatback 2. The locking system 29 may command a first cable (not shown) and a second cable 31 which actuate respectively the locking device 24 and the articulation mechanism 10. The locking system 29 may comprise an electric actuator of any suitable type (motor or other), or else be commanded manually if the seat is not electrically commanded.

As shown in FIG. 4*b*, the second cable 31 may be connected for example to a command lever 32 commanding one of the articulation mechanisms 10, connected by a conjugation strut 33 to a similar command lever 32 commanding the other articulation mechanism 10 when one is provided.

As shown in FIGS. 5*a* to 5*c*, the first cable may be connected to a command lever 34 for one of the locking devices 24, connected by a conjugation bar to a similar command lever 34 commanding the other locking device 24 when it is provided. FIG. 5*a* represents a detailed view of the seatback footing 23, and FIGS. 5*b* and 5*c* are views of the same parts from other angles, with in particular the side pieces 23*b* and the support 6*b* hidden.

The command lever 34 can for example be secured with a locking cam 39 mounted pivoting on the plate 36 secured to the seatback footing 23, around an axis of rotation Y10, parallel to axis Y1. The locking cam 39 may command the locking hook 37 which is mounted on the plate 36 around the transverse axis of rotation Y9 parallel to the axis Y1. The locking hook 37 is suited for catching on an anchoring member secured to the support 6*a*, for example a stiff metal rod secured to the base 6, for example by being welded to the support 6*b*.

The locking hook 37 can be urged by a hook spring (not shown) toward an unlocked position where said locking hook 37 does not interfere with the anchoring member, and it can be moved by the locking cam 39 under the force of a cam spring 40 stronger than the hook spring, into a locking position where said locking hook 37 hooks on the anchoring member while thus locking the seatback footing 23 to the support 6b. Note that the locking device 24 could be any other known type.

More specifically, in the embodiment shown, it is expected that the profile 6a comprises an opening 60a, for example, oblong, allowing the anchoring member to be disposed between a zone of the base 6 and a field of interference with the locking hook 37. For this purpose, the support 6b also comprises an opening 60b, for example, oblong, and, for example, of similar shape to the opening 60a. Each of the openings (60a, 60b) is placed in correspondence with the other when the support 6b is mounted on the profile 6a, so as to form the opening 60. In the specific embodiment shown in FIG. 5c, the locking hook 37 has a portion 370 comprising two fingers designated collectively by the reference 371, and substantially extending along the direction X when the locking hook 37 is in locked position. The fingers 371 allow the locking hook 37 to be given a U shape comprising a hollow shape. When the locking hook 37 is in locked position, the hollow shape is able to engage with a portion of the locking member extending along a transverse direction, with each of the fingers 371 being disposed extending transversely on either side of said portion.

According to an embodiment, the passage of the locking hook 37 between the locked position and the unlocked position is done by a movement of the locking hook 37 comprising a rotation in order to put the fingers 371 near said transverse portion of the anchoring member and engaging the hollow shape against it.

Figure 6A:
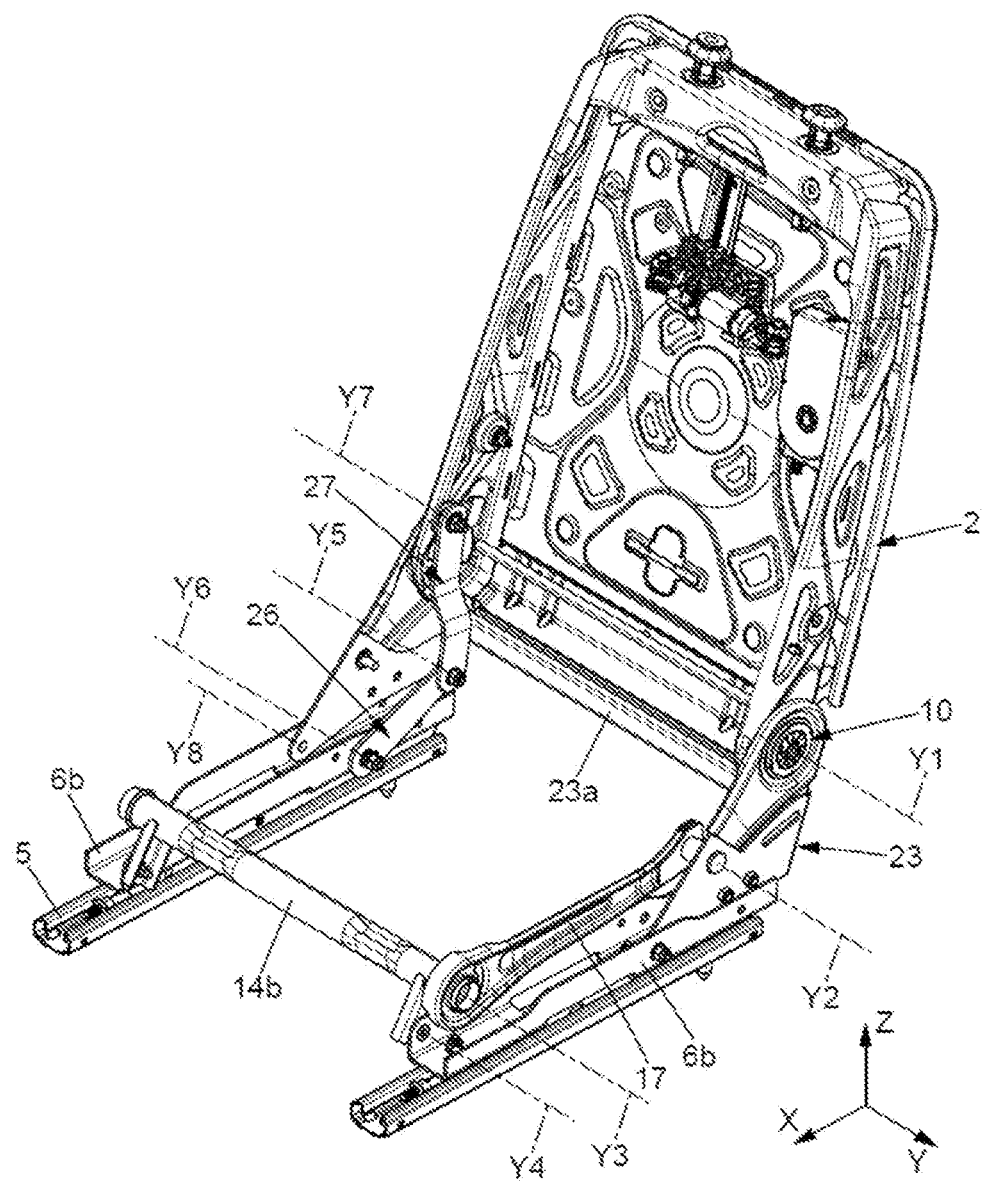
FIG. 6a is a detailed view of a part of FIG. 2 with elements hidden.

As shown in detail in FIG. 6a, the seatback 2 is connected to the base 6 by means of a first rear connecting rod 26 and a second rear connecting rod 27. The first rear connecting rod 26 is mounted pivoting on the base 6 by a sixth pivot Y6 and the second rear connecting rod 27 is mounted pivoting on the base 2 by a seventh pivot Y7. The first and second rear connecting rods (26, 27) are mounted pivoting relative to each other around a fifth pivot Y5. The pivots (Y5, Y6, Y7) are pivot connections articulated around respective transverse axis of rotation, also designated by the same respective references (Y5, Y6, Y7). In the embodiment shown, the transverse axes of rotation (Y5, Y6, Y7) are parallel to the transverse direction Y of the seat.

Figure 8:
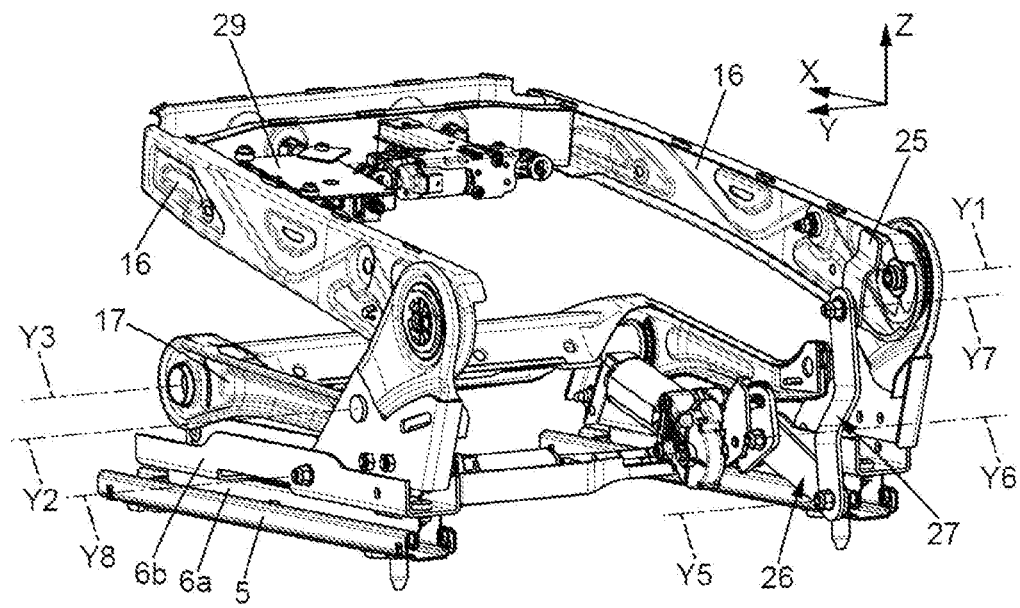
FIG. 8 is a rear view of the seat from FIG. 7 with elements hidden.

More specifically, the seatback 2 is connected to the support 6b of the base 6 by the mounting comprising the first and second rear connecting rods. As is seen in FIG. 8, the pivot connection Y5 connecting the first and second connecting rods (26, 27) is free relative to the seatback footing 23 and to the base 6. In normal position of use and in comfortable position, the axis Y5 is located, in a vertical direction, between the axis Y6 and the axis Y7, with the axis Y6 lower than the axis Y7. In the embodiment shown, seat 1 is provided with a pair of first and second connecting rods (26, 27) disposed on one side of the seat. In another embodiment, it can be expected that the seat is provided with two pairs of first and second connecting rods (26, 27) disposed on each of the sides of the seat, for example, symmetrically relative to a median plane XZ. In the embodiment shown, the first and second connecting rods (26, 27) comprise flat portions extending mainly in the XZ plane.

The axis Y8 is located further forward than the axis Y6. According to an embodiment, the axis Y2 is located, in a horizontal direction, between the axis Y5 and the axis Y6, with the axis Y6 located farther forward than the axis Y5. In normal position of use of the seat and also in comfortable position, the one or more connecting rods 19 are in raised position, and the axis Y4 is farther forward than the axis Y3 in a longitudinal direction X of the seat.

Figure 6B:
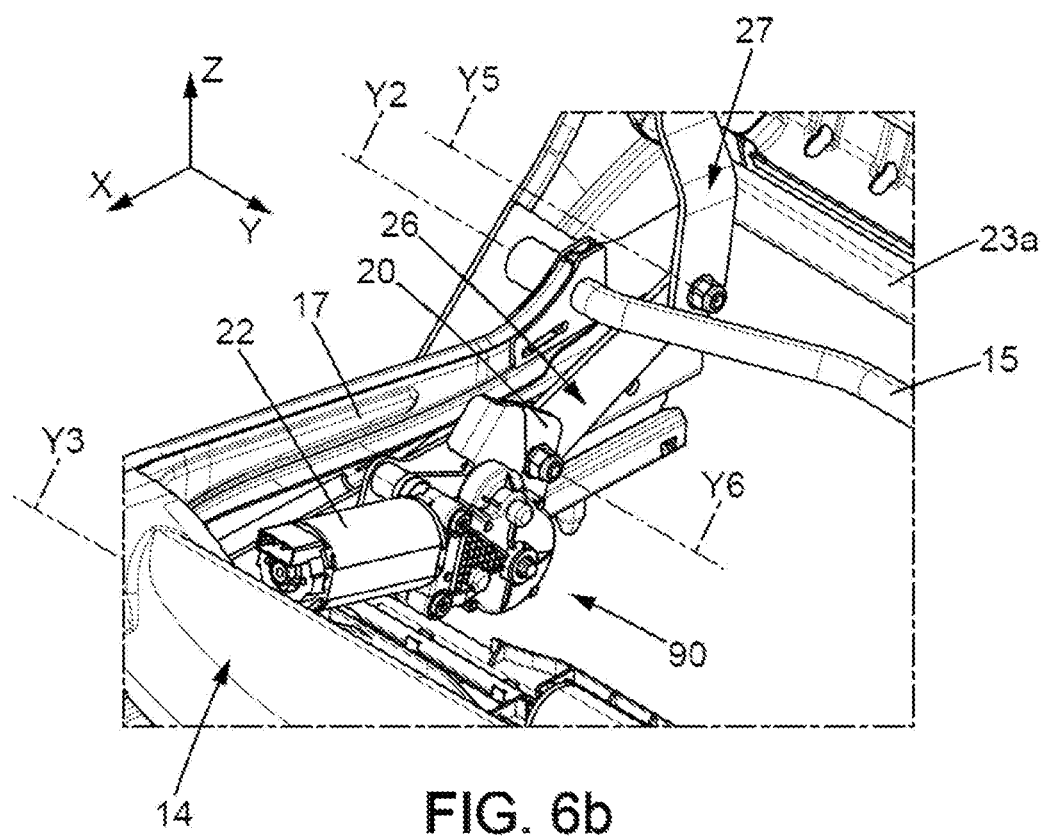
FIG. 6b is the detailed view from FIG. 6a with elements shown, according to one arrangement.

As is shown in more detail in FIG. 6b, the seat 1 comprises an actuating device 90 arranged near the seat cushion. In the embodiment shown, the actuation device 90 is fixed on one side of the base 6. More specifically, the actuating device 90 is fixed on the side of the base 6 on which the first connecting rod 26 is mounted.

Figure 6C:
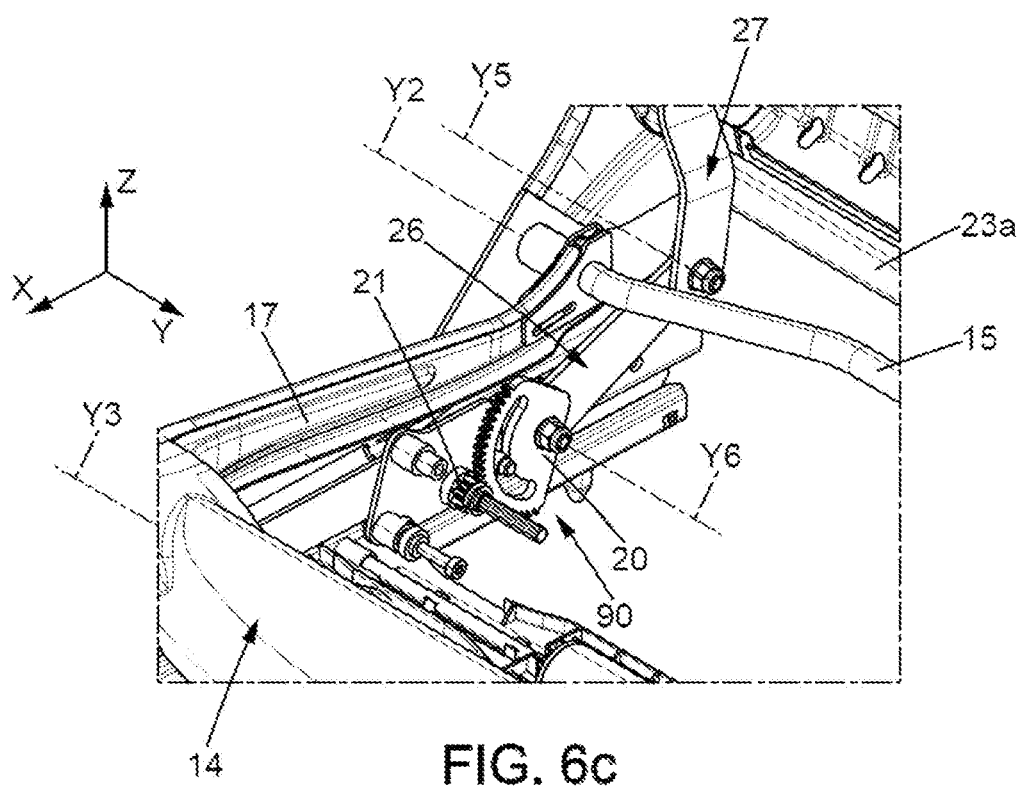
FIG. 6c is the detailed view from FIG. 6b in another arrangement.
Figure 16:
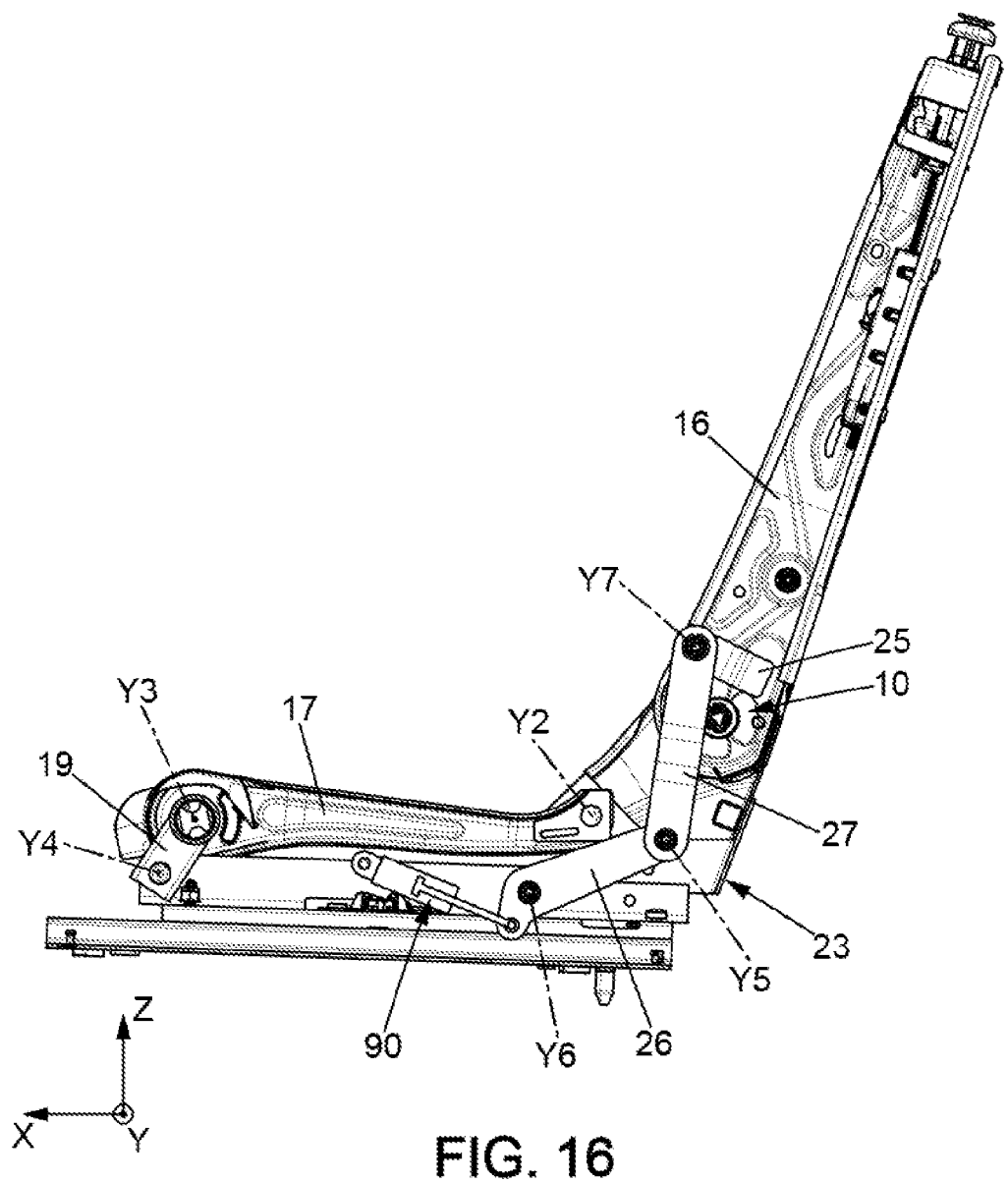
FIG. 16 is a section view of the seat from FIG. 2 along a median XZ plane, with a different actuating device.

As shown in FIG. 6c, the lower end of the first rear connecting rod 26 (or as applicable of two rear connecting rods 26) is provided with a toothed sector 20 centered on the axis Y6. In a sample embodiment, the actuating device 90 comprises an electric motor with a reduction gear 22 fixed to the support 6b and a pinion 21 commanded by the motor with reduction gear 22. The first rear connecting rod 26 is secured to the toothed sector 20 which meshes with the pinion 21. In another embodiment shown in FIG. 16, the actuating device 90 comprises a linear actuator, for example a hydraulic cylinder comprising a cylinder body and a piston arranged in the cylinder body. The hydraulic cylinder is connected to the first rear connecting rod 26 through the piston, where the cylinder body is fixed to the base 6, for example. More specifically, one end of the piston is secured to one end of the first rear connecting rod 26. The piston is mobile in translation in the cylinder body between a retracted position and an extended position. Translation of the piston between the retracted position and the extended position drives the rotation of the first rear connecting rod 26 around the sixth pivot Y6.

The first rear connecting rod 26 can therefore be commanded in rotation around the axis Y6. In the nonlimiting example shown and described below, the pair of first and second connecting rods (26, 27) is disposed on the right side of the seat, where the right side of the seat corresponds to the right side of a user occupying the seat in the normal way.

In normal position of use of the seat, the first rear connecting rod is in a rest position P0.

The clockwise rotation of the toothed sector 20, respectively the retraction of the linear actuator piston toward the retracted position, drives the clockwise rotation of the first rear connecting rod 26 around the transverse axis of rotation Y6. The first rear connecting rod 26 is then moved from position P0. Inversely, the counterclockwise rotation of the toothed sector 20, respectively the extension of the piston toward the extended position, drives the counterclockwise rotation of the first rear connecting rod 26 around the transverse axis of rotation Y6. In an embodiment, when the articulation mechanism 10 is unlocked, the seat 1 can be configured in comfortable position (FIGS. 3 and 13b) by adjusting the inclination of the seatback through the actuating mechanism 90.

When the seat is electrically commanded, it may comprise an electric command device 11, for example a microcontroller or as applicable a dedicated electronic circuit, which is configured for commanding the articulation mechanism 10, the locking device 24 and the actuating device 90 of the first rear connecting rod 26. More exactly, in the case described here, the electric command device 11 can command the locking system 29 and the actuation device 90 of the first rear connecting rod 26, and also as applicable the electrical adjustment of the tracks 4.

Figure 17:
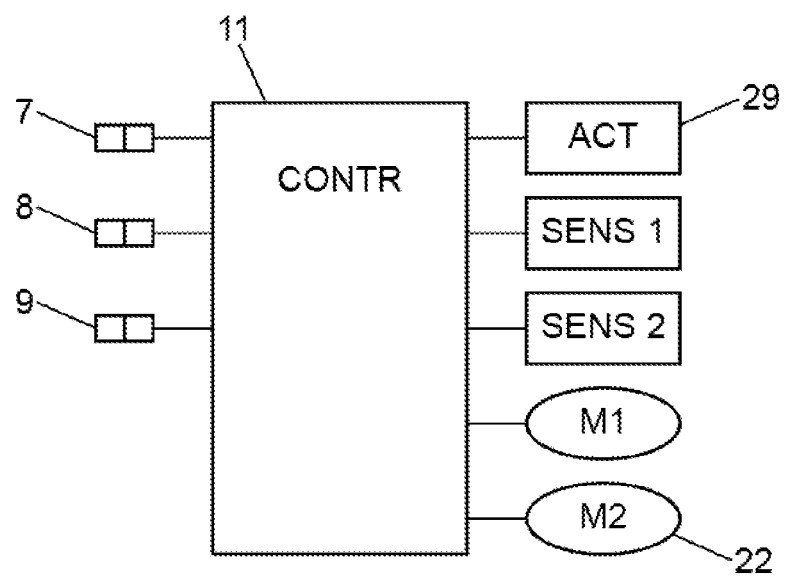
FIG. 17 is a functional diagram of the seat 1 according to one of FIGS. 1 to 16.

As shown in FIG. 17, the electric command device 11 (CONTR) may be commanded by the aforementioned actuation members 7, 8, 9 and is connected to the locking system 29 (ACT), to the electric motor M1 for adjustment of the tracks 4, to the electric motor with a reduction gear 22 (M2) of the actuation device 90 for the first rear connecting rod 26, and also to the sensors SENS1, SENS2 (in particular position sensors) respectively indicating the locking and/or unlocking state of the articulation mechanisms 10 and of the one or more locking devices 24 if more than one is intended, for example one on each side of the seat.

The electric command device 11 is configured for normally operating in a locking mode where the locking device 24 locks the seatback footing 23 onto the support 6b; the articulation mechanisms 10 are in locked position and the actuation device 90 is not actuated.

Upon actuation of the actuating member 7, the electric command device 11 is adapted for commanding an adjustment of the tracks 4.

On actuation of the actuating member 8, the electric command device 11 is suited for commanding the locking system 29 in order to put the articulation mechanisms 10 in unlocked position and then operating the actuation device 90 while also leaving the seatback footings 23 locked on the supports 6b. The actuation of the actuating device 90 moves the first rear connecting rod 26 by rotation from the position P0, in a direction of rotation designated as first direction of rotation.

Figure 13A:
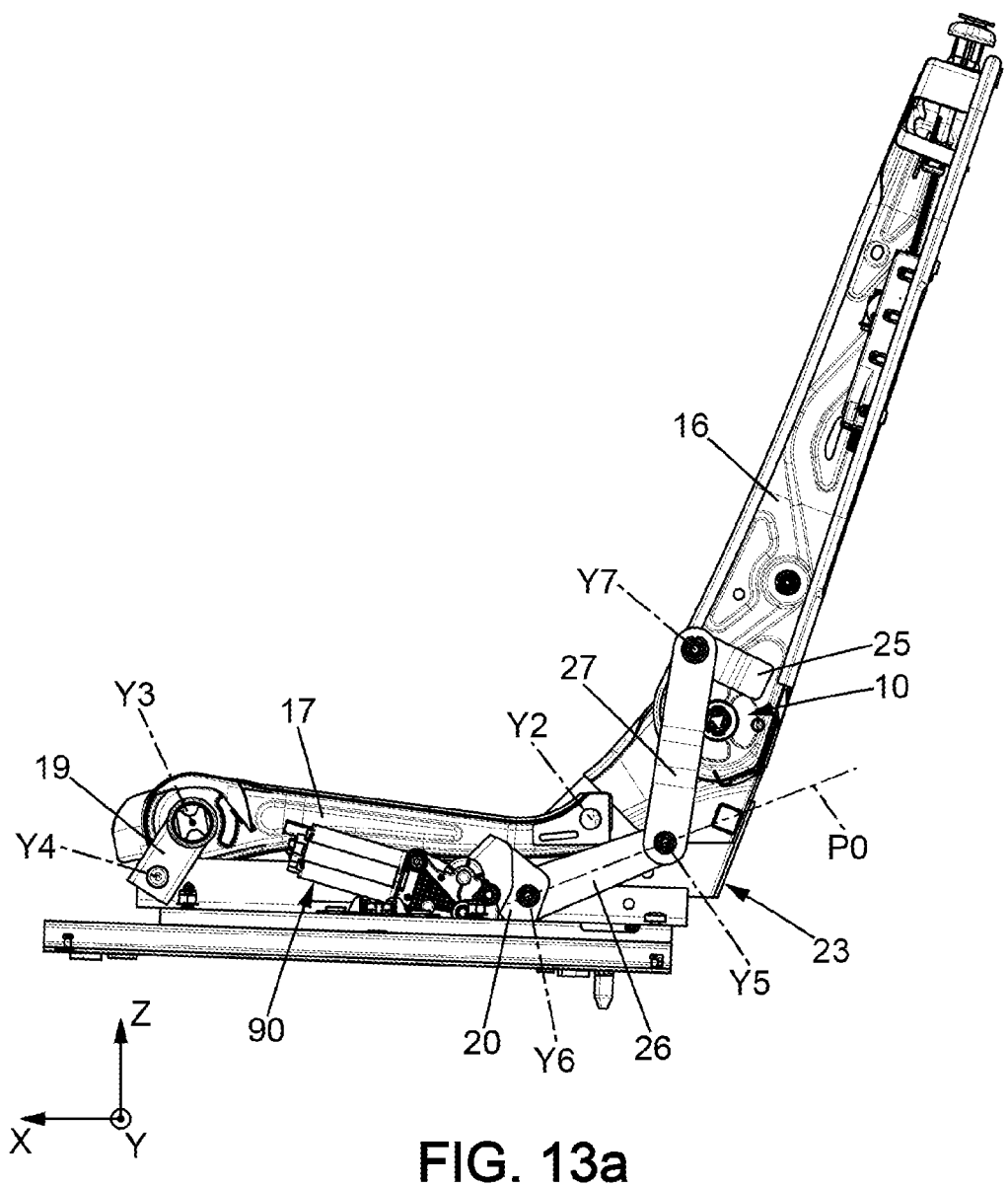
FIG. 13a is a section view of the seat from FIG. 2 along a median XZ plane.
Figure 13B:
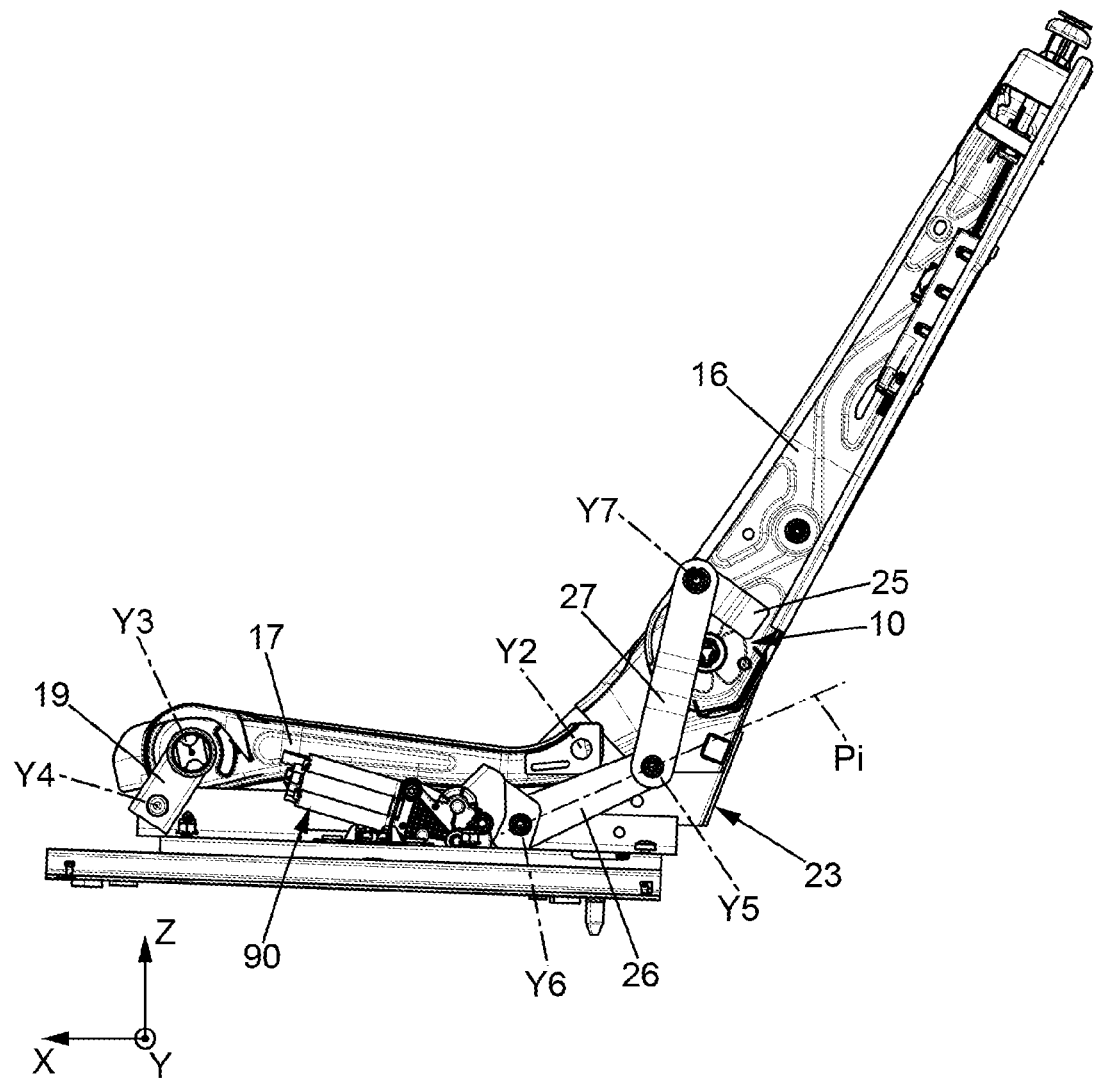
FIG. 13b is a section view of the seat from FIG. 3 along a median XZ plane.

Considering the arrangement of the axes (Y5, Y6, Y7) relative to each other in normal position of use, where such a disposition is shown in FIG. 13a, the rotation of the first rear connecting rod 26 in the clockwise direction drives the rotation of the second rear connecting rod 27 in the counterclockwise direction around the axis Y5. The actuating device 90 drives the first rear connecting rod 26 from a connecting rod resting position P0 where the pivot Y5 is higher than the pivot Y6 and farther forward than the pivot Y7, toward a first connecting rod position P1 where the pivot Y5 is lower than the pivot Y6 and where the pivot Y7 is farther forward than the pivot Y5. The pivot Y6 remains farther forward than the pivots Y5 and Y7. When the first rear connecting rod 26 is in first connecting rod position P1, the distance along the longitudinal direction X between the pivot Y5 and the pivot Y6 is substantially equal to that when the first rear connecting rod 26 is in rest position P0.

Figure 7:
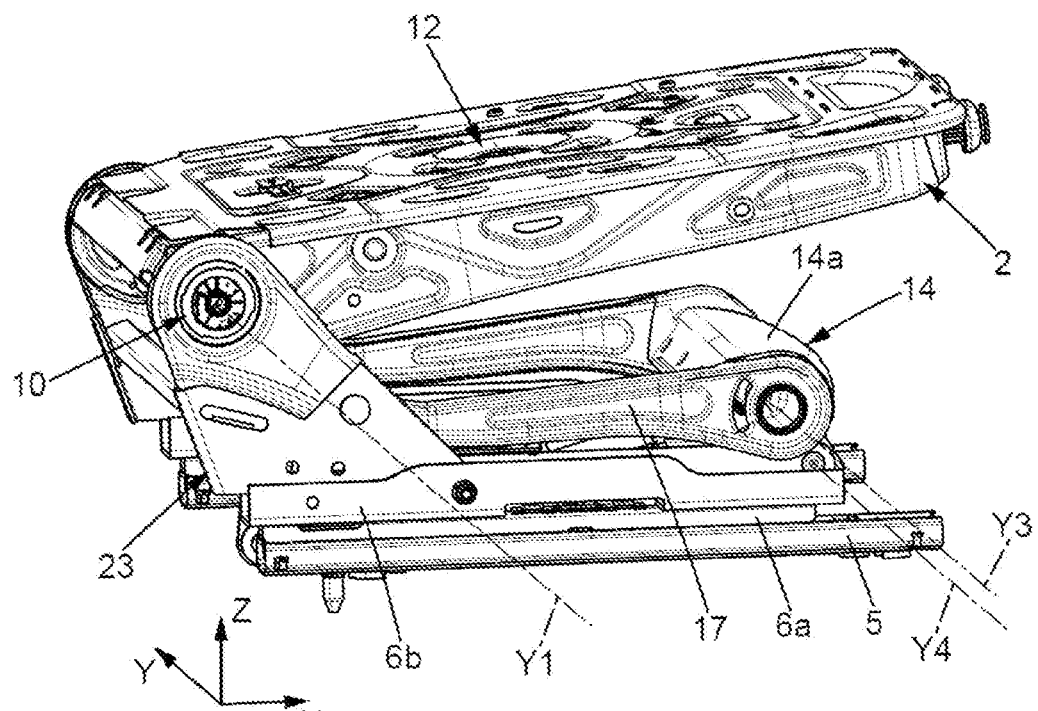
FIG. 7 shows a perspective view of the seat with the seatback in folded down and retracted position, according to a mode of use of the seat from FIG. 2.
Figure 9:
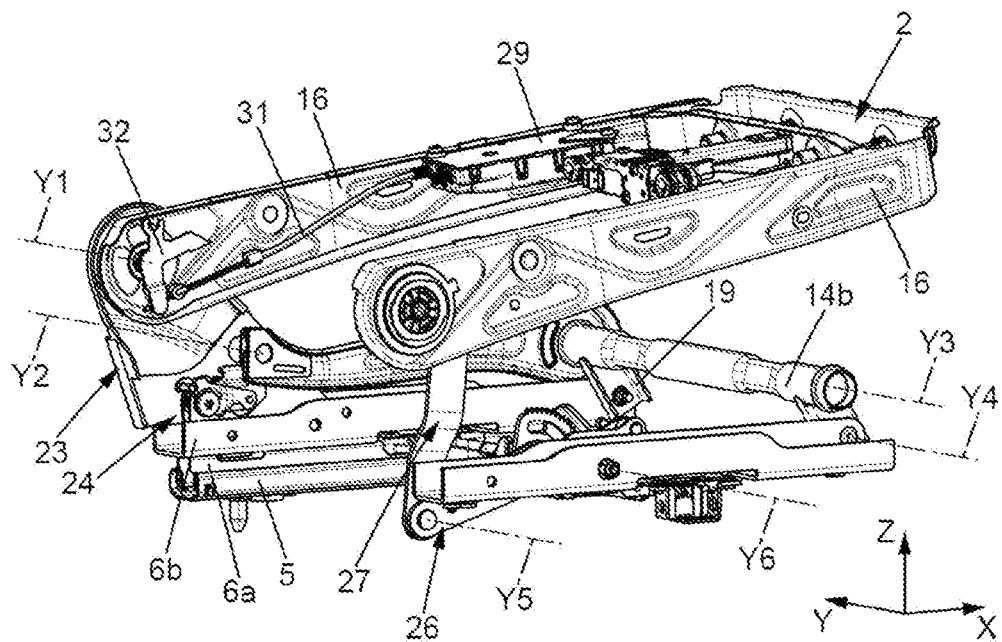
FIG. 9 is a lateral view of the seat from FIG. 7 with elements hidden.

When the first rear connecting rod 26 is moved into position P1, the seatback 2 is folded down toward a retracted position, as is shown in FIGS. 7 to 9, such that the back 12 extends in a plane substantially parallel to the floor, and in this case horizontally. According to these dispositions, the first direction of rotation is the clockwise direction.

A mounting position 25 near the pivot Y7 is provided disposed on the lateral side plate 16 on the side where the pair of first and second rear connecting rods (26, 27) is located. The mounting portion 25 is secured to the seatback 2 and is arranged transversely to the direction along which the seatback extends. When the seatback is inclined rearward around the axis Y1, for example from a normal position of use toward a comfortable position, the locking device 24 remains in locked position, and the mounting portion 25 rotates clockwise around the axis Y7. Inversely, when the seatback 2 is brought forward, for example from a comfortable position such as is visible in FIG. 13b, the mounting portion has a counterclockwise motion around the axis Y7.

Figure 14:
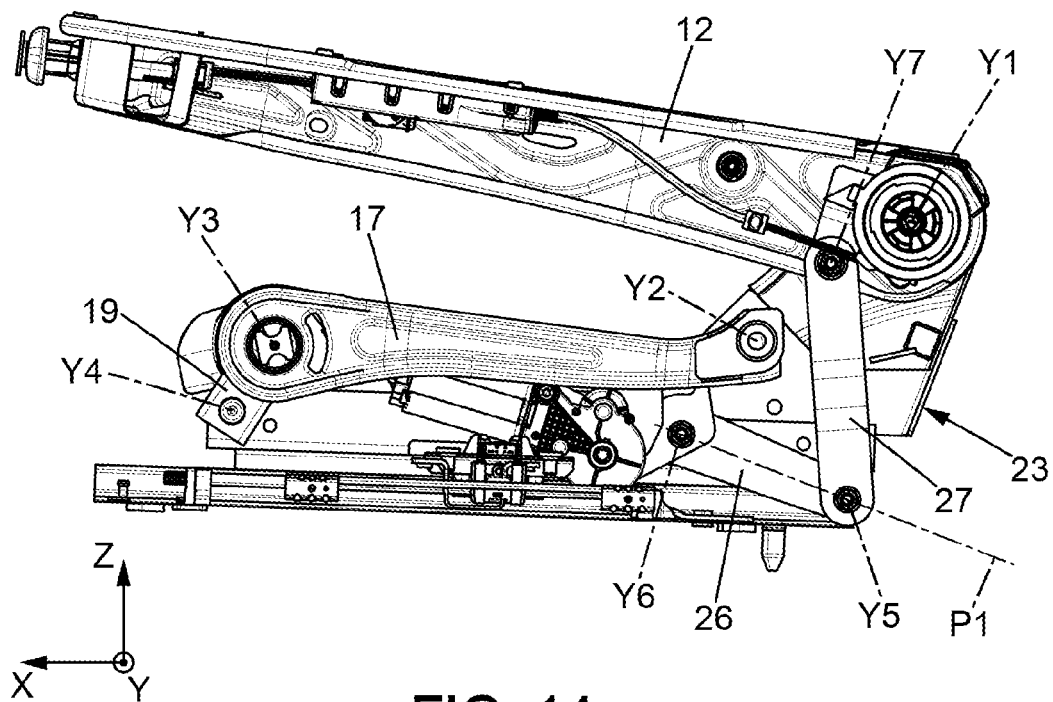
FIG. 14 is a section view of the seat from FIG. 7 along a median XZ plane.

When the seatback 2 is in normal position of use or in comfortable position, the pivot Y7 is located higher than the pivot Y1 of the articulation mechanism 10. When the first rear connecting rod 26 is moved from the position P0 toward the position P1 in order to fold-down the seatback 2 toward a retracted position, such as seen in FIG. 14, the pivot Y1 is located higher than the pivot Y7. Such a disposition clearly reflects that the seatback 2 was folded down toward a horizontal plane XY. Further, as is seen in FIG. 9, the front connecting rods 19 remain in the raised position since the disposition of the seatback in retracted position does not move the front connecting rods 19.

This retracted position could allow use of the rear surface of the seatback 2 as an armrest for at least one neighboring seat. According to an embodiment, the actuation of the actuating member 8 in the opposite direction then serves to return to normal position of use.

On actuation of the actuating member 9, the electric command device 11 is suited for commanding the locking system 29 in order to unlock the locking device 24 for releasing the seatback footing 23 and then operate the actuation device 90 while also leaving the articulation mechanisms 10 in a locked position.

Upon actuation of the actuating member 9, the actuation device 90 drives the first rear connecting rod 26 in rotation around the pivot Y6. More specifically, on actuation of the actuating member 9, the first rear connecting rod 26 is moved from the position P0 toward the second connecting rod position P2, shown on FIG. 15. According to the embodiment shown, the second direction of rotation is opposite the first direction of rotation and corresponds to the counterclockwise direction.

The angle formed between the first rear connecting rod 26 and the second rear connecting rod 27 remains substantially fixed when the first rear connecting rod 26 is moved between the connecting rod rest position P0 and the second connecting rod position P2. The second rear connecting rod 27 is thus rotated counterclockwise around the axis Y6. Since the articulation mechanism 10 is locked, the position of the mounting part 25 relative to the second rear connecting rod 27 remains substantially fixed when the first rear connecting rod 26 is moved between the connecting rod rest position P0 and the second connecting rod position P2. Further, actuation of the first rear connecting rod 26 in rotation between the rest position and an intermediate position Pi of the connecting rod serves to adjust the tilt of the seatback for the comfort of the user, when the articulation mechanism 10 is unlocked and the locking device 24 is locked. In an embodiment, the intermediate connecting rod position Pi is located between the rest position P0 and the second connecting rod position P2, where the first rear connecting rod 26 is actuated in the second direction for driving the seatback toward the comfortable position. The seatback 2 is then rotated relative to the seatback footing 23 around the first pivot Y1 between a normal position of use and a comfortable position. In another embodiment, it is conceivable that the intermediate connecting rod position Pi is located between the rest position P0 and the first connecting rod position P1.

The actuating device 90 drives the first rear connecting rod 26 from a position P0 where the pivot Y6 is further forward than the pivot Y5, the pivot Y5 being farther forward than the pivots Y7 and Y1, toward a second connecting rod position P2 which places the pivot Y5 substantially vertical from the pivot Y6, while still remaining to the rear of the pivot Y6. In a longitudinal direction X, the pivot Y5 is closer to the pivot Y6 when the first rear connecting rod 26 is in second connecting rod position P2 than when it is in rest position P0. The pivot Y1 is placed slightly forward of the pivot Y6, substantially vertical therefrom. Since the pivot Y7 remains farther forward than the pivot Y1, the pivot Y1 is also farther forward than the pivot Y5. Since the locking device 24 is in unlocked position and the articulation mechanism 10 is locked, the seatback footings 23 are rotated forward around the pivot Y8 and the entire seat 1 is tilted forward. The tilted forward position of the seat allows the user to more easily access a space located behind the seat 1 in question.

Figure 15:
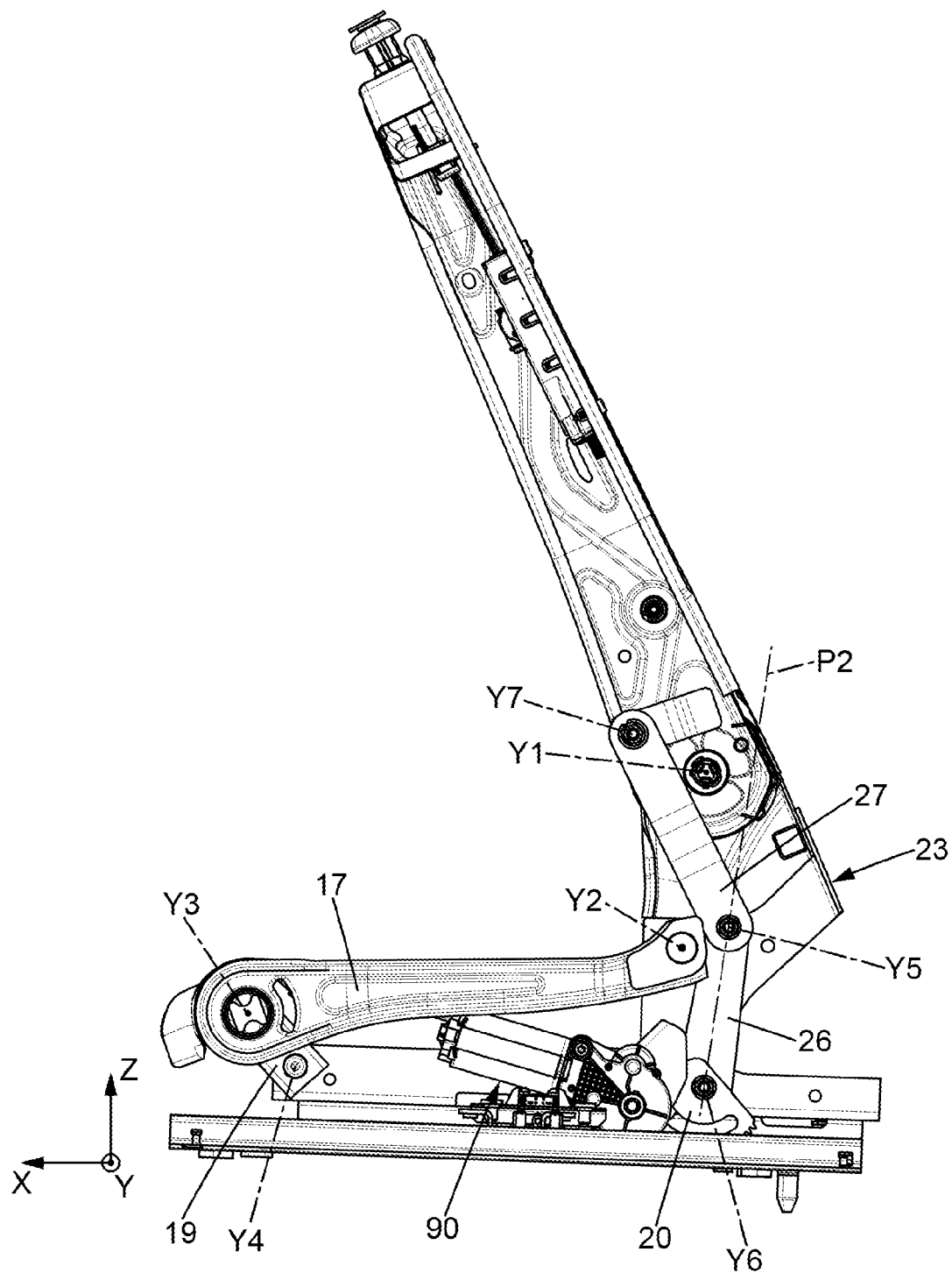
FIG. 15 is a section view of the seat from FIG. 10 along a median XZ plane.

In normal position of use and in comfortable position, the pivot Y2 is located between the pivot Y6 and the pivot Y5 in the longitudinal direction X. As can be seen in FIG. 15, tilting the seat forward drives the seat bottom 3, and in particular the curved longitudinal connecting rod 17, in a movement comprising a forward translation, such that the pivot Y2 is placed farther forward than the pivots Y6 and Y5 once the first rear connecting rod 26 reaches the second connecting rod position P2.

The movement of the seat bottom when the seat is tilted forward also comprises a forward rotation, such that the curved longitudinal connecting rods 17 are in a higher position when the first rear connecting rod is in second connecting rod position P2 then went it is in connecting rod rest position P0. In fact, the pivot Y2 is located higher, in particular farther from the third pivot Y3 in a vertical direction upward, when the seat is tilted forward then when it is in normal position for use, comfortable position or retracted.

More specifically, when the seat is in normal position for use or in comfortable position, the fourth pivot Y4 is located farther forward than the third pivot Y3 and the front connecting rods 19 are in raised position. When the seat is tilted forward, the front connecting rods 19 are in tilted position, and the third pivot Y3 is farther forward than the fourth pivot Y4. The height of the third pivot Y3, in particular relative to the fourth pivot Y4, is substantially unchanged.

The actuation of the actuating member 9 in the opposite direction then serves to return to normal position of use.

In another embodiment, the functions executed by each of the actuating members 8 and 9 could be done using a single actuation member. For example, an actuating member is conceivable comprising a rotary actuator and suited for commanding the folding down of the seatback toward the retracted position by rotation of said rotary actuator in a first direction, and for commanding the tilting of the seat forward by rotation of said rotary actuator in a second direction, where said second direction is advantageously opposite the first direction for more comfort of manipulation by the user.

In another embodiment, the actuation member comprises a user command input interface configured for communicating with the electric command device 11 for sending it said commands from the user. Said interface can advantageously be configured for receiving data from the command device 11, indicating for example the locking/unlocking state of the articulation mechanism 10 and/or of the locking device 24, the disposition of elements of the seat, and the state of execution of the commands from the user. The state of execution of commands from the user can advantageously include the state of progress of the execution of said commands, and/or the reporting of an incident blocking execution thereof because of the presence of an obstacle, for example.

The invention claimed is:

1. A vehicle seat comprising:
 a seatback;
 a seat cushion comprising at least one longitudinal connecting rod;
 a base;
 a seatback footing mounted on the base, wherein a locking device is selectively lockable for locking the seatback footing on the base and unlockable for releasing the seatback footing, and the released seatback footing is rotationally mobile relative to the base;
 wherein the seatback is mounted pivoting on the seatback footing about a first pivot by an articulation mechanism suited for adjusting an angular position of the seatback, wherein the articulation mechanism is mobile between a locked position where the seatback is immobilized relative to the seatback footing, and an unlocked position where the seatback can pivot relative to the seatback footing around the first pivot;
 wherein the seat cushion is mounted pivoting on the seatback footing around a second pivot parallel to the first pivot, and where said seat cushion is supported by at least one front connecting rod connected pivotably to the seat cushion by a third pivot and to the base by a fourth pivot, wherein the front connecting rod is mobile between a raised position for normal use of the seat and a position tilted forward;
 wherein the seatback is connected to the base by a first rear connecting rod mounted pivoting on a second rear connecting rod by a fifth pivot, wherein the first rear connecting rod is mounted pivoting on the base by a sixth pivot, wherein the second rear connecting rod is mounted pivoting on the seatback by a seventh pivot, and wherein the fifth, sixth and seventh pivots are parallel to the first pivot, the seat further comprising an actuating device configured for actuating the first rear connecting rod in rotation around the sixth pivot;
 the seat further comprising an electric command device configured for controlling the articulation mechanism, the locking device and the actuation device, the electric command device being configured for normally being in a locking mode where the locking device locks the seatback footing onto the base, the articulation mechanism is in a locked position and the actuation device is not actuated, and said electric command device being actuatable for either:
 putting the articulation mechanism in unlocked position and then operating the actuating device while leaving the seatback footing locked onto the base; or
 unlocking the locking device for releasing the seatback footing and then operating the actuating device while leaving the articulation mechanism in the locked position.

2. The vehicle seat of claim 1, wherein the actuating device is further configured for actuating the first connecting rod in rotation:
 in a first direction, from a rest position to a first connecting rod position, when the articulation mechanism is unlocked and the locking mechanism is locked, by driving the seatback toward a substantially horizontal retracted position by means of the second connecting rod; and
 in a second direction, from the rest position toward a second connecting rod position, when the articulation mechanism is locked and the locking device is unlocked, by driving the seat cushion and the seatback into a first position tilted forward.

3. The vehicle seat of claim 1, wherein the actuation device is further configured for actuating the first rear connecting rod in rotation from a rest position to an intermediate connecting rod position when the articulation mechanism is unlocked and the locking device is locked, wherein the seatback is rotated relative to the seatback footing around the first pivot between a normal position of use and a comfortable position.

4. The vehicle seat of claim 1, wherein the seventh pivot is located forward of the first pivot.

5. The vehicle seat of claim 1, wherein the actuation device comprises a pinion commanded by an electric motor, where the first rear connecting rod is provided with a toothed sector meshing with the pinion.

6. The vehicle seat of claim 1, wherein the actuation device comprises a hydraulic cylinder provided with a cylinder body and a piston arranged in the cylinder body, wherein the piston is configured for actuating the first rear connecting rod in rotation around the sixth pivot by translation in the cylinder body, and wherein the cylinder body is fixed to the base.

7. The vehicle seat of claim 1, wherein the seat has two sides and comprises, respectively on the two sides:
a front connecting rod;
a seatback footing;
a first rear connecting rod connected to a side of the seatback;
a second rear connecting rod connected respectively to one side of the base;
wherein the actuating device is configured for actuating the two first rear connecting rods.

8. The vehicle seat of claim 1, wherein the articulation mechanism and the locking device are commanded by a single locking command system belonging to the seatback, wherein said electric command device controls the locking command system and the actuating device.

9. A vehicle seat comprising:
a seatback;
a seat cushion comprising at least one longitudinal connecting rod;
a base;
a seatback footing mounted on the base, wherein a locking device is selectively lockable for locking the seatback footing on the base and unlockable for releasing the seatback footing, and the released seatback footing is rotationally mobile relative to the base;
wherein the seatback is mounted pivoting on the seatback footing about a first pivot by an articulation mechanism suited for adjusting an angular position of the seatback, wherein the articulation mechanism is mobile between a locked position where the seatback is immobilized relative to the seatback footing, and an unlocked position where the seatback can pivot relative to the seatback footing around the first pivot;
wherein the seat cushion is mounted pivoting on the seatback footing around a second pivot parallel to the first pivot, and where said seat cushion is supported by at least one front connecting rod connected pivotably to the seat cushion by a third pivot and to the base by a fourth pivot, wherein the front connecting rod is mobile between a raised position for normal use of the seat and a position tilted forward;
wherein the seatback is connected to the base by a first rear connecting rod mounted pivoting on a second rear connecting rod by a fifth pivot, wherein the first rear connecting rod is mounted pivoting on the base by a sixth pivot, wherein the second rear connecting rod is mounted pivoting on the seatback by a seventh pivot, and wherein the fifth, sixth and seventh pivots are parallel to the first pivot, the seat further comprising an actuating device configured for actuating the first rear connecting rod in rotation around the sixth pivot; and
wherein the actuation device comprises a pinion commanded by an electric motor, wherein the first rear connecting rod is provided with a toothed sector meshing with the pinion.

10. A vehicle seat comprising:
a seatback;
a seat cushion comprising at least one longitudinal connecting rod;
a base;
a seatback footing mounted on the base, wherein a locking device is selectively lockable for locking the seatback footing on the base and unlockable for releasing the seatback footing, and the released seatback footing is rotationally mobile relative to the base;
wherein the seatback is mounted pivoting on the seatback footing about a first pivot by an articulation mechanism suited for adjusting an angular position of the seatback, wherein the articulation mechanism is mobile between a locked position where the seatback is immobilized relative to the seatback footing, and an unlocked position where the seatback can pivot relative to the seatback footing around the first pivot;
wherein the seat cushion is mounted pivoting on the seatback footing around a second pivot parallel to the first pivot, and where said seat cushion is supported by at least one front connecting rod connected pivotably to the seat cushion by a third pivot and to the base by a fourth pivot, wherein the front connecting rod is mobile between a raised position for normal use of the seat and a position tilted forward;
wherein the seatback is connected to the base by a first rear connecting rod mounted pivoting on a second rear connecting rod by a fifth pivot, wherein the first rear connecting rod is mounted pivoting on the base by a sixth pivot, wherein the second rear connecting rod is mounted pivoting on the seatback by a seventh pivot, and wherein the fifth, sixth and seventh pivots are parallel to the first pivot, the seat further comprising an actuating device configured for actuating the first rear connecting rod in rotation around the sixth pivot; and
wherein the actuation device comprises a hydraulic cylinder provided with a cylinder body and a piston arranged in the cylinder body, wherein the piston is configured for actuating the first rear connecting rod in rotation around the sixth pivot by translation in the cylinder body, and wherein the cylinder body is fixed to the base.

* * * * *